(12) United States Patent
Shoji et al.

(10) Patent No.: US 11,180,187 B2
(45) Date of Patent: Nov. 23, 2021

(54) MOTOR CONTROL DEVICE

(71) Applicant: JTEKT CORPORATION, Osaka (JP)

(72) Inventors: Naoki Shoji, Uda (JP); Robert Fuchs, Nara (JP); Tsutomu Tamura, Nara (JP); Mitsuko Yoshida, Nara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/390,040

(22) Filed: Apr. 22, 2019

(65) Prior Publication Data
US 2019/0329818 A1 Oct. 31, 2019

(30) Foreign Application Priority Data

Apr. 27, 2018 (JP) .............................. JP2018-086452
Sep. 27, 2018 (JP) .............................. JP2018-182677

(51) Int. Cl.
*B62D 5/04* (2006.01)
*B62D 1/28* (2006.01)
*B62D 6/00* (2006.01)

(52) U.S. Cl.
CPC ........... *B62D 5/0463* (2013.01); *B62D 1/286* (2013.01); *B62D 6/007* (2013.01); *B62D 6/008* (2013.01)

(58) Field of Classification Search
CPC ...... B62D 5/0463; B62D 1/286; B62D 6/007; B62D 6/008
See application file for complete search history.

(56) References Cited

U.S. PATENT DOCUMENTS 8,055,409 B2    11/2011  Tsuchiya
2012/0296525 A1*  11/2012  Endo ..................... B62D 6/008
                                                          701/42

(Continued)

FOREIGN PATENT DOCUMENTS

EP    3 213 979 A1    9/2017
JP    2004-256076 A   9/2004

(Continued)

OTHER PUBLICATIONS

Machine Translation of JP2015058736 (Year: 2015).*

(Continued)

*Primary Examiner* — Anne Marie Antonucci
*Assistant Examiner* — Sahar Motazedi
(74) *Attorney, Agent, or Firm* — Oliff PLC

(57) ABSTRACT

A manual steering command value generation unit generates a manual steering command value using steering torque. An integrated angle command value computation unit computes an integrated angle command value by adding the manual steering command value to an automatic steering command value. A control unit performs angle control on an electric motor on the basis of the integrated angle command value. The control unit includes: a basic torque command value computation unit that computes a basic torque command value on the basis of the integrated angle command value; a disturbance torque estimation unit that estimates disturbance torque other than motor torque that is generated by the electric motor and acts on an object to be driven by the electric motor; and a disturbance torque compensation unit that corrects the basic torque command value in accordance with the disturbance torque.

11 Claims, 18 Drawing Sheets

(56) References Cited

U.S. PATENT DOCUMENTS

| | | | |
|---|---|---|---|
| 2013/0060427 A1* | 3/2013 | Kataoka | B62D 5/0466 |
| | | | 701/42 |
| 2014/0343794 A1 | 11/2014 | Tamaizumi et al. | |
| 2015/0191199 A1 | 7/2015 | Tsubaki et al. | |
| 2015/0191200 A1 | 7/2015 | Tsubaki et al. | |
| 2016/0129935 A1* | 5/2016 | Akatsuka | B62D 15/025 |
| | | | 180/446 |
| 2016/0176440 A1 | 6/2016 | Witte et al. | |
| 2016/0318546 A1* | 11/2016 | Lee | B62D 6/008 |
| 2017/0137056 A1* | 5/2017 | Aoki | B62D 6/008 |
| 2017/0217479 A1* | 8/2017 | Tsubaki | B62D 5/0466 |
| 2017/0217485 A1 | 8/2017 | Oshima | |
| 2017/0253265 A1 | 9/2017 | Nishimura | |
| 2020/0010111 A1* | 1/2020 | Tsubaki | B62D 15/025 |

FOREIGN PATENT DOCUMENTS

| | | | |
|---|---|---|---|
| JP | 2004256076 A | * | 9/2004 |
| JP | 2005088610 A | * | 4/2005 |
| JP | 2007237840 A | * | 9/2007 |
| JP | 2015058736 A | * | 3/2015 |
| WO | 2014/162769 A1 | | 10/2014 |

OTHER PUBLICATIONS

Machine Translation of JP2005088610 (Year: 2005).*
Machine Translation of JP2004256076 (Year: 2004).*
Machine Translation of JP2007237840A (Year: 2007).*
Oct. 24, 2019 Extended European Search Report issued in European Patent Application No. 19171099.5.

* cited by examiner

MOTOR CONTROL DEVICE

INCORPORATION BY REFERENCE

The disclosure of Japanese Patent Application No. 2018-086452 filed on Apr. 27, 2018 and No. 2018-182677 filed on Sep. 27, 2018 including the specification, drawings and abstract, is incorporated herein by reference in its entirety.

BACKGROUND OF THE INVENTION

1. Field of the Invention

The present invention relates to a control device for an electric motor for steering angle control.

2. Description of the Related Art

In automatic drive and drive assist in which an electric power steering (EPS) system, a steer-by-wire system, a rear wheel steering system, etc. is used, the steered angle of steered wheels is controlled by an electric motor. In this type of motor control, angle feedback control in which motor torque of the electric motor is controlled in accordance with the difference between a target steered angle and the actual steered angle is used. PID control is commonly used as the angle feedback control. Specifically, target torque is computed by multiplying a term of the difference between the target steered angle and the actual steered angle, an integral term of the difference, and a differential term of the difference by a proportional gain, an integral gain, and a differential gain, respectively, and thereafter adding such terms. Then, the electric motor is controlled such that the motor torque becomes equal to the target torque. (See Japanese Patent Application Publication No. 2004-256076 (JP 2004-256076 A) and WO 2014/162769.)

Since the PID control discussed earlier uses a linear control algorithm, the precision of angle control is lowered or fluctuated by fluctuations in non-linear disturbance torque such as road surface load torque (disturbance torque on the rack shaft side), friction torque of the steering system, and steering torque (disturbance torque on the steering side).

SUMMARY OF THE INVENTION

It is an object of the present invention to provide a motor control device that can suppress the effect of disturbance torque on the angle control performance and that can perform high-precision angle control.

An aspect of the present invention provides a motor control device that performs drive control on an electric motor for steering angle control, the motor control device including: a manual steering command value generation unit that generates a manual steering command value using steering torque; an integrated angle command value computation unit that computes an integrated angle command value by adding the manual steering command value to an automatic steering command value; and a control unit that performs angle control on the electric motor on the basis of the integrated angle command value, in which the control unit includes a basic torque command value computation unit that computes a basic torque command value on the basis of the integrated angle command value, a disturbance torque estimation unit that estimates disturbance torque other than motor torque that is generated by the electric motor and acts on an object to be driven by the electric motor, and a disturbance torque compensation unit that corrects the basic torque command value in accordance with the disturbance torque.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
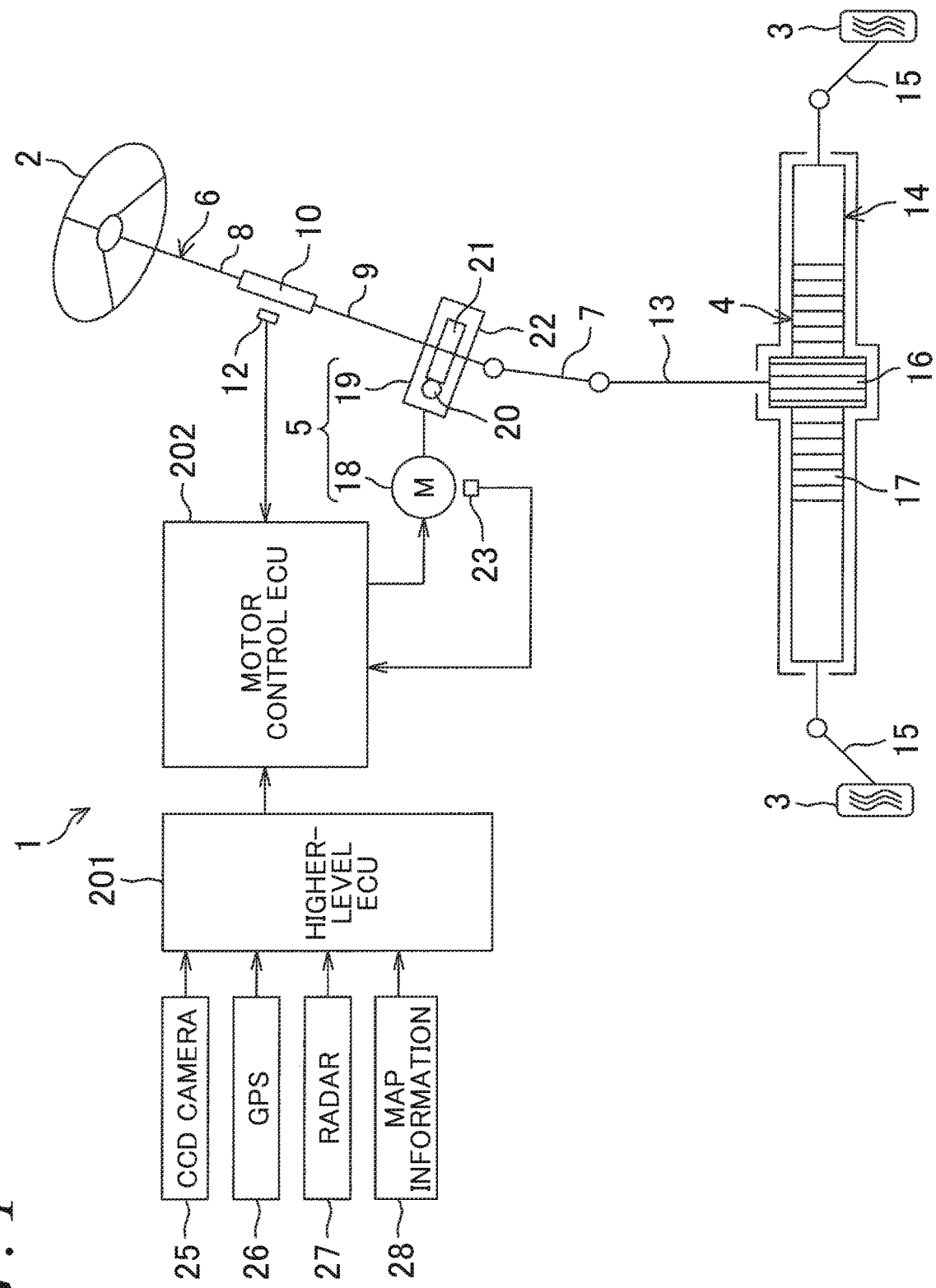
FIG. 1 is a schematic diagram illustrating a schematic configuration of an electric power steering system to which a motor control device according to an embodiment of the present invention is applied.

An embodiment of the present invention will be described in detail below with reference to the accompanying drawings. FIG. 1 is a schematic diagram illustrating a schematic configuration of an electric power steering system to which a motor control device according to an embodiment of the present invention is applied. An electric power steering system 1 includes a steering wheel 2, a steering operation mechanism 4, and a steering assist mechanism 5. The steering wheel 2 is a steering member configured to steer the vehicle. The steering operation mechanism 4 steers steered wheels 3 in conjunction with rotation of the steering wheel 2. The steering assist mechanism 5 assists a driver in steering. The steering wheel 2 and the steering operation mechanism 4 are mechanically coupled to each other via a steering shaft 6 and an intermediate shaft 7.

The steering shaft 6 includes an input shaft 8 coupled to the steering wheel 2, and an output shaft 9 coupled to the intermediate shaft 7. The input shaft 8 and the output shaft 9 are coupled so as to be rotatable relative to each other via a torsion bar 10. A torque sensor 12 is disposed in the vicinity of the torsion bar 10. The torque sensor 12 detects steering torque (torsion bar torque) $T_d$ provided to the steering wheel 2 on the basis of the amount of relative rotational displacement between the input shaft 8 and the output shaft 9. In the embodiment, the steering torque $T_d$ that is detected by the torque sensor 12 is detected as a positive value when the vehicle is steered to the left, and as a negative value when the vehicle is steered to the right, for example. The magnitude of the steering torque $T_d$ is larger as the absolute value of the positive or negative value is larger.

The steering operation mechanism 4 is composed of a rack-and-pinion mechanism that includes a pinion shaft 13 and a rack shaft 14 that serves as a steered shaft. The steered wheels 3 are coupled to end portions of the rack shaft 14 via tie rods 15 and knuckle arms (not illustrated). The pinion shaft 13 is coupled to the intermediate shaft 7. The pinion shaft 13 is rotated in conjunction with a steering operation of the steering wheel 2. A pinion 16 is coupled to the distal end of the pinion shaft 13.

The rack shaft 14 extends linearly along the right-left direction of the vehicle. A rack 17 meshed with the pinion 16 is formed at an intermediate portion of the rack shaft 14 in the axial direction. The pinion 16 and the rack 17 convert rotation of the pinion shaft 13 into movement of the rack shaft 14 in the axial direction. The steered wheels 3 can be steered by moving the rack shaft 14 in the axial direction.

When the steering wheel 2 is operated (rotated), rotation of the steering wheel 2 is transferred to the pinion shaft 13 via the steering shaft 6 and the intermediate shaft 7. The pinion 16 and the rack 17 convert rotation of the pinion shaft 13 into movement of the rack shaft 14 in the axial direction. Consequently, the steered wheels 3 are steered. The steering assist mechanism 5 includes an electric motor 18 and a speed reducer 19. The electric motor 18 generates a steering assist force (assist torque). The speed reducer 19 amplifies output torque of the electric motor 18 and transfers the amplified output torque to the steering operation mechanism 4. The speed reducer 19 is composed of a worm gear mechanism that includes a worm gear 20 and a worm wheel 21 meshed with the worm gear 20. The speed reducer 19 is housed in a gear housing 22 that serves as a transfer mechanism housing. In the following description, the speed reduction ratio (gear ratio) of the speed reducer 19 is occasionally represented by N. The speed reduction ratio N is defined as a ratio ωwg/ωww of an angular velocity ωwg of the worm gear 20 to an angular velocity www of the worm wheel 21.

The worm gear 20 is rotationally driven by the electric motor 18. The worm wheel 21 is coupled so as to be rotatable together with the output shaft 9. When the worm gear 20 is rotationally driven by the electric motor 18, the worm wheel 21 is rotationally driven to provide motor torque to the steering shaft 6 and rotate the steering shaft 6 (output shaft 9). Rotation of the steering shaft 6 is transferred to the pinion shaft 13 via the intermediate shaft 7. Rotation of the pinion shaft 13 is converted into movement of the rack shaft 14 in the axial direction. Consequently, the steered wheels 3 are steered. That is, the worm gear 20 is rotationally driven by the electric motor 18 to enable steering assist by the electric motor 18 and steering of the steered wheels 3. The electric motor 18 is provided with a rotational angle sensor 23 configured to detect the rotational angle of a rotor of the electric motor 18.

Torque applied to the output shaft 9 (an example of an object to be driven by the electric motor 18) includes motor torque applied by the electric motor 18 and disturbance torque other than the motor torque. Disturbance torque $T_{lc}$ other than the motor torque includes the steering torque $T_d$, road surface load torque (road surface reaction force torque) $T_{rl}$, friction torque $T_f$, etc. The steering torque $T_d$ is torque applied from the steering wheel 2 to the output shaft 9 by a force applied to the steering wheel 2 by the driver, a force generated by the steering inertia, etc.

The road surface load torque $T_{rl}$ is torque applied from the side of the steered wheels 3 to the output shaft 9 via the rack shaft 14 by self-aligning torque generated in the tires, a force generated by suspensions or tire wheel alignment, a friction force of the rack-and-pinion mechanism, etc. The vehicle includes, as mounted thereon, a Charge Coupled Device (CCD) camera 25, a Global Positioning System (GPS) 26, a radar 27, and a map information memory 28. The CCD camera 25 photographs a road ahead in the advancing direction of the vehicle. The GPS 26 detects the position of the vehicle. The radar 27 detects the shape of the road and an obstacle. The map information memory 28 stores map information.

The CCD camera 25, the GPS 26, the radar 27, and the map information memory 28 are connected to a higher-level Electronic Control Unit (ECU) 201 configured to perform drive assist control and automatic drive control. The higher-level ECU 201 recognizes the surrounding environment, estimates the vehicle position, makes route planning, etc. on the basis of information obtained through the CCD camera 25, the GPS 26, and the radar 27 and the map information, and determines control target values for steering and drive actuators.

In the embodiment, the higher-level ECU 201 sets an automatic steering command value $\theta_{adac}$ for automatic steering. In the embodiment, automatic steering control is control for causing the vehicle to travel along a target track, for example. The automatic steering command value $\theta_{adac}$ is a target value for a steering angle for causing the vehicle to automatically travel along the target track. A process of setting such an automatic steering command value $\theta_{adac}$ is well known, and therefore is not described in detail herein.

The automatic steering command value $\theta_{adac}$ that is set by the higher-level ECU 201 is provided to a motor control ECU 202 via an in-vehicle network. The steering torque $T_d$ that is detected by the torque sensor 12 and an output signal from the rotational angle sensor 23 are input to the motor control ECU 202. The motor control ECU 202 controls the electric motor 18 on the basis of such input signals and information provided from the higher-level ECU 201.

Figure 2:
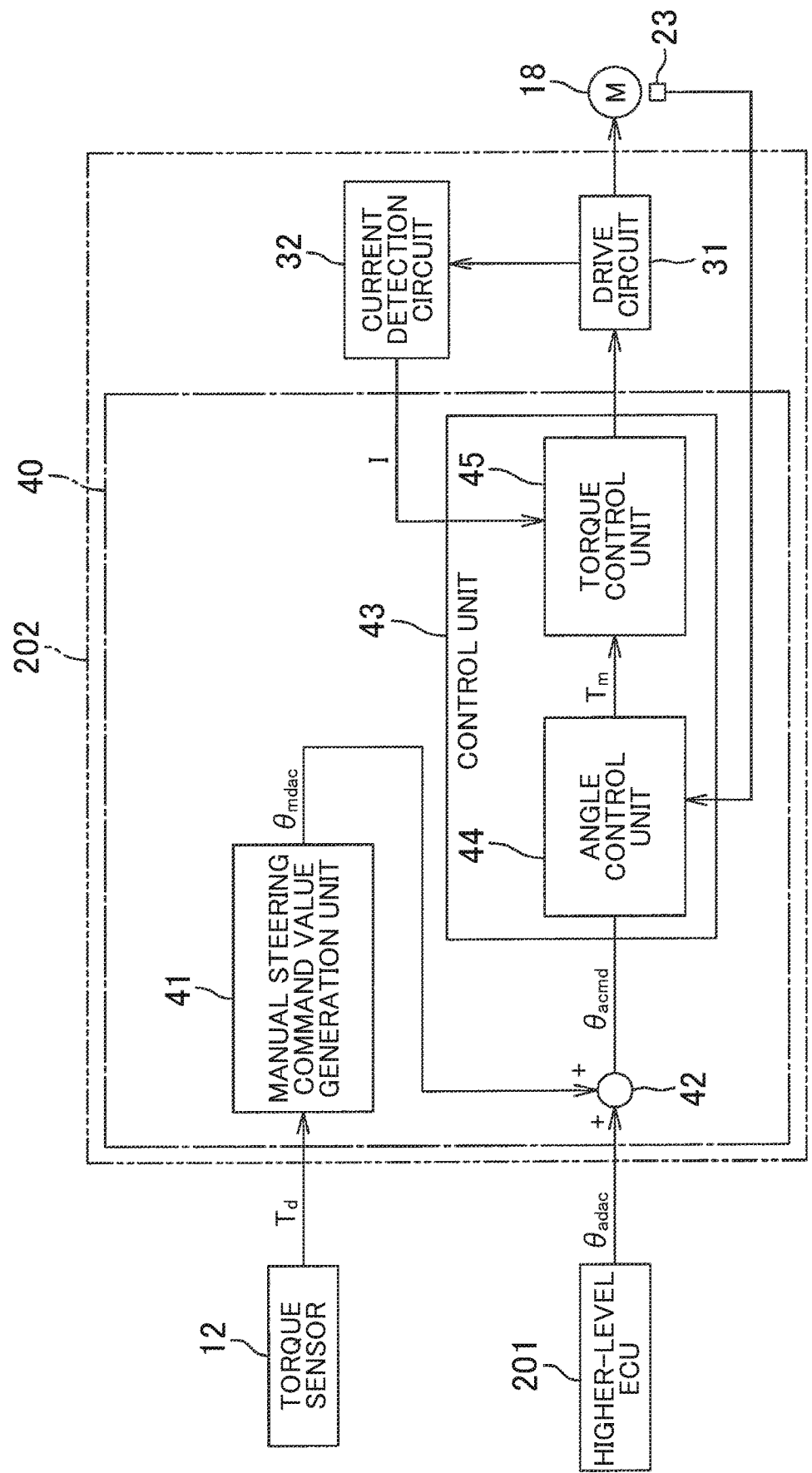
FIG. 2 is a block diagram illustrating the electric configuration of a motor control ECU.

FIG. 2 is a block diagram illustrating the electric configuration of the motor control ECU 202.

The motor control ECU 202 includes a microcomputer 40, a drive circuit (inverter circuit) 31, and a current detection circuit 32. The drive circuit 31 is controlled by the microcomputer 40, and supplies electric power to the electric motor 18. The current detection circuit 32 detects a current (hereinafter referred to as a "motor current I") that flows through the electric motor 18.

The microcomputer 40 includes a central processing unit (CPU) and a memory (such as a read-only memory (ROM), a random-access memory (RAM), or a non-volatile memory). The microcomputer 40 executes a predetermined program to function as a plurality of function processing units. The plurality of function processing units includes a manual steering command value generation unit 41, an integrated angle command value computation unit 42, and a control unit 43. The manual steering command value generation unit 41 is provided to set a steering angle (to be more exact, a rotational angle θ of the output shaft 9) that matches a steering wheel operation as a manual steering command value $θ_{mdac}$ in the case where the driver operates the steering wheel 2. The manual steering command value generation unit 41 generates the manual steering command value $θ_{mdac}$ using the steering torque $T_d$ that is detected by the torque sensor 12.

The integrated angle command value computation unit 42 computes an integrated angle command value $θ_{acmd}$ by adding the manual steering command value $θ_{mdac}$ to the automatic steering command value $θ_{adac}$ that is set by the higher-level ECU 201.

The control unit 43 performs angle control on the electric motor 18 on the basis of the integrated angle command value $θ_{acmd}$. More specifically, the control unit 43 performs drive control on the drive circuit 31 such that the steering angle θ (rotational angle θ of the output shaft 9) approximates the integrated angle command value $θ_{acmd}$.

Figure 3:
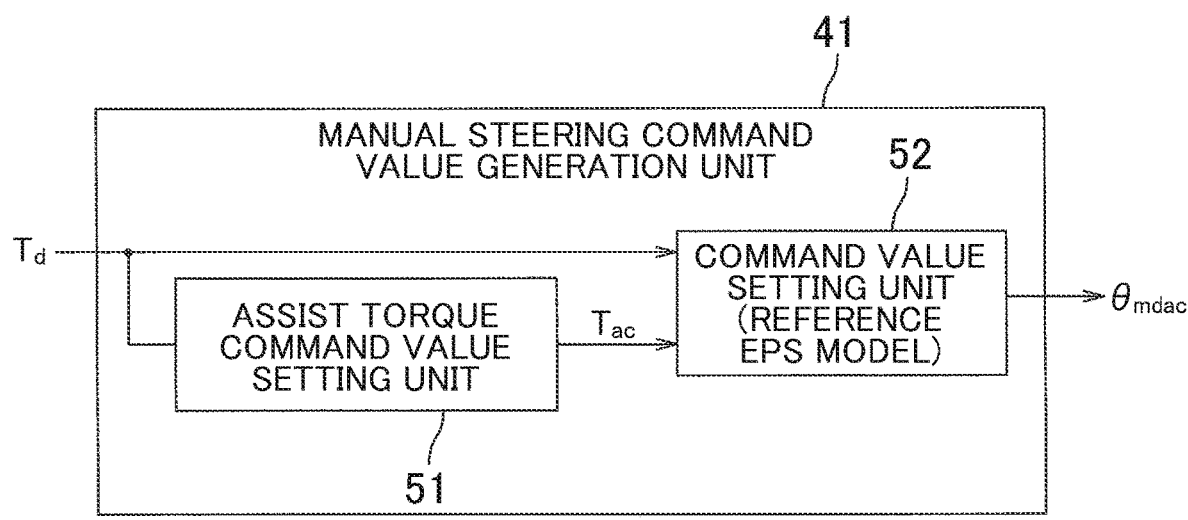
FIG. 3 is a block diagram illustrating the configuration of a manual steering command value generation unit.

The control unit 43 includes an angle control unit 44 and a torque control unit (current control unit) 45. The angle control unit 44 computes a motor torque command value $T_m$ that is a target value for the motor torque of the electric motor 18, on the basis of the integrated angle command value $θ_{acmd}$. The torque control unit 45 drives the drive circuit 31 such that the motor torque of the electric motor 18 approximates the motor torque command value $T_m$. FIG. 3 is a block diagram illustrating the configuration of the manual steering command value generation unit 41.

Figure 4:
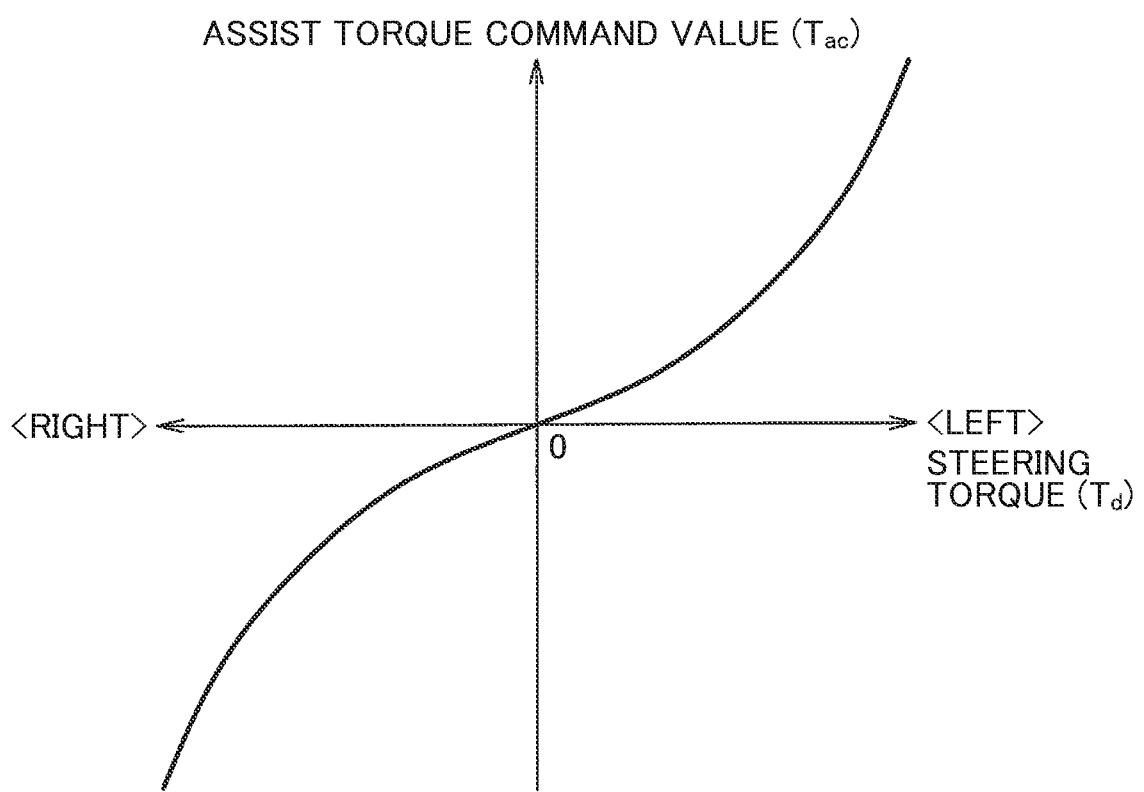
FIG. 4 is a graph illustrating an example of an assist torque command value $T_{ac}$ set with respect to steering torque $T_d$.

The manual steering command value generation unit 41 includes an assist torque command value setting unit 51 and a command value setting unit 52. The assist torque command value setting unit 51 sets an assist torque command value $T_{ac}$ that is a target value for assist torque that is necessary for a manual operation. The assist torque command value setting unit 51 sets the assist torque command value $T_{ac}$ on the basis of the steering torque $T_d$ that is detected by the torque sensor 12. An example of the assist torque command value $T_{ac}$ that is set with respect to the steering torque $T_d$ is indicated in FIG. 4.

The assist torque command value $T_{ac}$ has a positive value when the electric motor 18 should generate a steering assist force for steering the vehicle to the left, and a negative value when the electric motor 18 should generate a steering assist force for steering the vehicle to the right. The assist torque command value $T_{ac}$ is positive when the steering torque $T_d$ has a positive value, and is negative when the steering torque $T_d$ has a negative value. The assist torque command value $T_{ac}$ is set such that the absolute value thereof becomes larger as the absolute value of the steering torque $T_d$ becomes larger.

Figure 5:
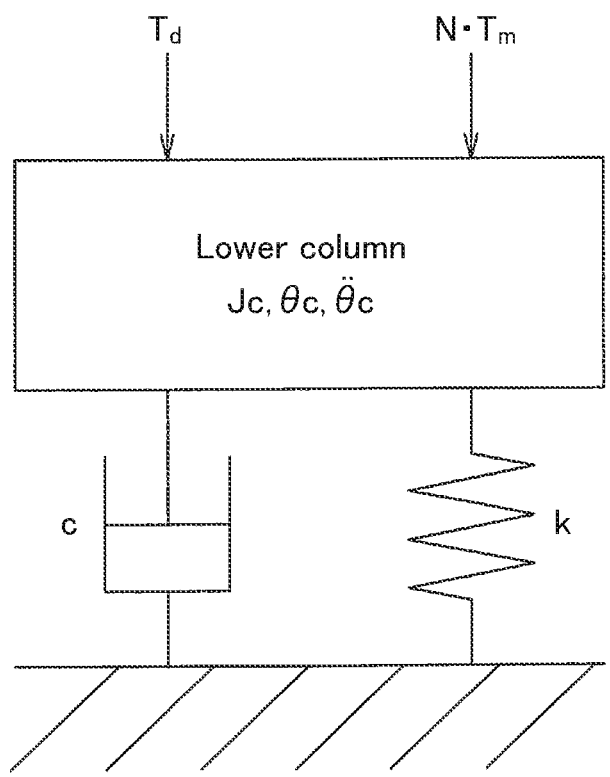
FIG. 5 is a schematic diagram illustrating an example of a reference EPS model that is used by a command value setting unit.

The assist torque command value setting unit 51 may compute the assist torque command value $T_{ac}$ by multiplying the steering torque $T_d$ by a constant set in advance. In the embodiment, the command value setting unit 52 sets the manual steering command value $θ_{mdac}$ using a reference EPS model. FIG. 5 is a schematic diagram illustrating an example of the reference EPS model that is used by the command value setting unit 52.

The reference EPS model is a single inertia model that includes a lower column. The lower column corresponds to the output shaft 9 and the worm wheel 21. In FIG. 5, Jc is the inertia of the lower column, θc is the rotational angle of the lower column, and $T_d$ is the steering torque. The lower column is provided with the steering torque $T_d$, torque $N \cdot T_m$ applied from the electric motor 18 to the output shaft 9, and the road surface load torque $T_{rl}$. The road surface load torque $T_{rl}$ is represented by the following formula (1) using a spring constant k and a viscous damping coefficient c.

$$T_{rl} = -k \cdot θc - c(dθc/dt) \quad (1)$$

In the embodiment, the spring constant k and the viscous damping coefficient c are set to predetermined values obtained in advance through an experiment, analysis, etc. The equation of motion of the reference EPS model is represented by the following formula (2).

$$Jc \cdot d^2θc/dt^2 = T_d + N \cdot T_m - k \cdot θc - c(dθc/dt) \quad (2)$$

The command value setting unit 52 solves the differential equation of the formula (2) by substituting the steering torque $T_d$ that is detected by the torque sensor 12, into $T_d$, and substituting the assist torque command value $T_{ac}$ that is set by the assist torque command value setting unit 51, into $N \cdot T_m$. Consequently, the rotational angle θc of the lower column is computed. Then, the command value setting unit 52 sets the obtained rotational angle θc of the lower column as the manual steering command value $θ_{mdac}$.

Figure 6:
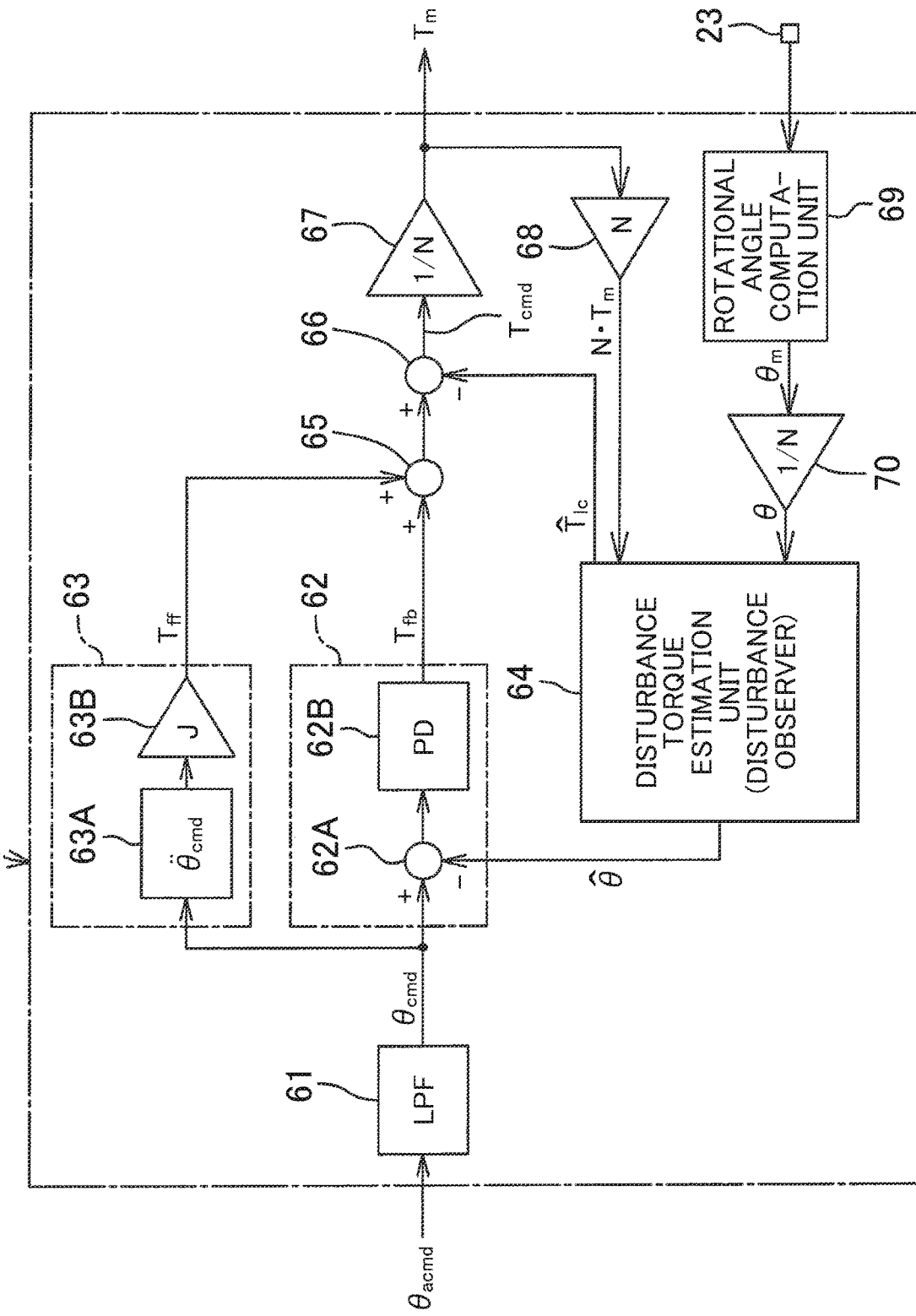
FIG. 6 is a block diagram illustrating the configuration of an angle control unit.

FIG. 6 is a block diagram illustrating the configuration of the angle control unit 44. The angle control unit 44 computes the motor torque command value $T_m$ on the basis of the integrated angle command value $θ_{acmd}$. The angle control unit 44 includes a low-pass filter (LPF) 61, a feedback control unit 62, a feedforward control unit 63, a disturbance torque estimation unit 64, a torque addition unit 65, a disturbance torque compensation unit 66, a first speed reduction ratio division unit 67, a speed reduction ratio multiplication unit 68, a rotational angle computation unit 69, and a second speed reduction ratio division unit 70.

The speed reduction ratio multiplication unit 68 multiplies the motor torque command value $T_m$ that is computed by the first speed reduction ratio division unit 67, by the speed reduction ratio N of the speed reducer 19. Consequently, the motor torque command value $T_m$ is converted into a steering torque command value $T_{cmd}$ ($=N \cdot T_m$) that acts on the output shaft 9 (worm wheel 21). The rotational angle computation unit 69 computes the rotor rotational angle $θ_m$ of the electric motor 18 on the basis of the output signal from the rotational angle sensor 23. The second speed reduction ratio division unit 70 divides the rotor rotational angle $θ_m$ that is computed by the rotational angle computation unit 69, by the speed reduction ratio N. Consequently, the rotor rotational angle $θ_m$ is converted into a rotational angle (actual steering angle) θ of the output shaft 9.

The low-pass filter 61 performs a low-pass filter process on the integrated angle command value $θ_{acmd}$. An integrated angle command value $θ_{cmd}$ after the low-pass filter process is provided to the feedback control unit 62 and the feedforward control unit 63. The feedback control unit 62 is provided to approximate an estimated steering angle value $\hat{\theta}$ that is computed by the disturbance torque estimation unit 64, to the integrated angle command value $\theta_{cmd}$ after the low-pass filter process. The feedback control unit 62 includes an angle deviation computation unit 62A and a PD control unit 62B. The angle deviation computation unit 62A computes a deviation $\Delta\theta(=\theta_{cmd}-\hat{\theta})$ between the integrated angle command value $\theta_{cmd}$ and the estimated steering angle value $\hat{\theta}$. The angle deviation computation unit 62A may compute a deviation $(\theta_{cmd}-\theta)$ between the integrated angle command value $\theta_{cmd}$ and the actual steering angle $\theta$ that is computed by the second speed reduction ratio division unit 70, as an angle deviation 40.

The PD control unit 62B performs PD computation (proportional-differential computation) on the angle deviation 40 that is computed by the angle deviation computation unit 62A. Consequently, feedback control torque $T_{fb}$ is computed. The feedback control torque $T_{fb}$ is provided to the torque addition unit 65. The feedforward control unit 63 is provided to improve the response of control by compensating for a delay in the response due to the inertia of the electric power steering system 1. The feedforward control unit 63 includes an angular acceleration computation unit 63A and an inertia multiplication unit 63B. The angular acceleration computation unit 63A calculates a second-order differential of the integrated angle command value $\theta_{cmd}$. Consequently, a target angle acceleration $d^2\theta_{cmd}/dt^2$ is computed.

The inertia multiplication unit 63B multiplies the target angle acceleration $d^2\theta_{cmd}/dt^2$ that is computed by the angular acceleration computation unit 63A, by the inertia J of the electric power steering system 1. Consequently, feedforward control torque $T_{ff}(=J \cdot d^2\theta_{cmd}/dt^2)$ is computed. The inertia J is calculated from a physical model (see FIG. 7) of the electric power steering system 1 to be discussed later, for example. The feedforward control torque $T_{ff}$ is provided to the torque addition unit 65 as an inertia compensation value.

The torque addition unit 65 adds the feedforward control torque $T_{ff}$ to the feedback control torque $T_{fb}$. Consequently, a basic torque command value $(T_{fb}+T_{ff})$ is computed. The disturbance torque estimation unit 64 is provided to estimate non-linear torque (disturbance torque: torque other than the motor torque) generated as disturbance for a plant (object to be controlled by the electric motor 18). The disturbance torque estimation unit 64 estimates the disturbance torque (disturbance load) $T_{lc}$, the steering angle $\theta$, and a steering angle differential value (angular velocity) $d\theta/dt$ on the basis of the steering torque command value $T_{cmd}$ ($=N \cdot T_m$) that is input to the plant, and the actual steering angle $\theta$ that is output from the plant. Estimated values of the disturbance torque $T_{lc}$, the steering angle $\theta$, and the steering angle differential value (angular velocity) $d\theta/dt$ are represented as $\hat{T}_{lc}$, $\hat{\theta}$, and $d\hat{\theta}/dt$, respectively. The disturbance torque estimation unit 64 will be discussed in detail later.

The estimated disturbance torque value $\hat{T}_{lc}$ that is computed by the disturbance torque estimation unit 64, is provided to the disturbance torque compensation unit 66 as a disturbance torque compensation value. The estimated steering angle value $-\hat{\theta}$ that is computed by the disturbance torque estimation unit 64, is provided to the angle deviation computation unit 62A. The disturbance torque compensation unit 66 subtracts the estimated disturbance torque value $\hat{T}_{lc}$ from the basic torque command value $(T_{fb}+T_{ff})$. Consequently, the steering torque command value $T_{cmd}(=T_{fb}+T_{ff}-\hat{T}_{lc})$ is computed. Consequently, the steering torque command value $T_{cmd}$ (torque command value for the output shaft 9) that has been compensated for the disturbance torque is obtained.

The steering torque command value $T_{cmd}$ is provided to the first speed reduction ratio division unit 67. The first speed reduction ratio division unit 67 divides the steering torque command value $T_{cmd}$ by the speed reduction ratio N. Consequently, the motor torque command value $T_m$ is computed. The motor torque command value $T_m$ is provided to the torque control unit 45 (see FIG. 2). The disturbance torque estimation unit 64 will be described in detail. The disturbance torque estimation unit 64 is constituted of a disturbance observer that estimates the disturbance torque $T_{lc}$, the steering angle $\theta$, and the angular velocity $d\theta/dt$ using a physical model 101 of the electric power steering system 1 illustrated in FIG. 7, for example.

The physical model 101 includes a plant (an example of an object to be driven by the motor) 102 that includes the output shaft 9 and the worm wheel 21 that is fixed to the output shaft 9. The plant 102 is provided with the steering torque $T_d$ from the steering wheel 2 via the torsion bar 10, and the road surface load torque $T_{rl}$ from the side of the steered wheels 3. Further, the plant 102 is provided with the steering torque command value $T_{cmd}$ ($=N \cdot T_m$) via the worm gear 20, and with the friction torque $T_f$ through friction between the worm wheel 21 and the worm gear 20.

When the inertia of the plant 102 is defined as J, the equation of motion for the inertia of the physical model 101 is represented by the following formula (3).

$$J\ddot{\theta}=N \cdot T_m+T_{lc}$$

$$T_{lc}=T_d+T_{rl}+T_f \quad (3)$$

$d^2\theta/dt^2$ is the angular acceleration of the plant 102. N is the speed reduction ratio of the speed reducer 19. $T_{lc}$ indicates the disturbance torque other than the motor torque that is provided to the plant 102. In the embodiment, the disturbance torque $T_{lc}$ is indicated as the sum of the steering torque $T_d$, the road surface load torque $T_{rl}$, and the friction torque $T_f$. In reality, however, the disturbance torque $T_{lc}$ includes torque other than such torques.

Figure 7:
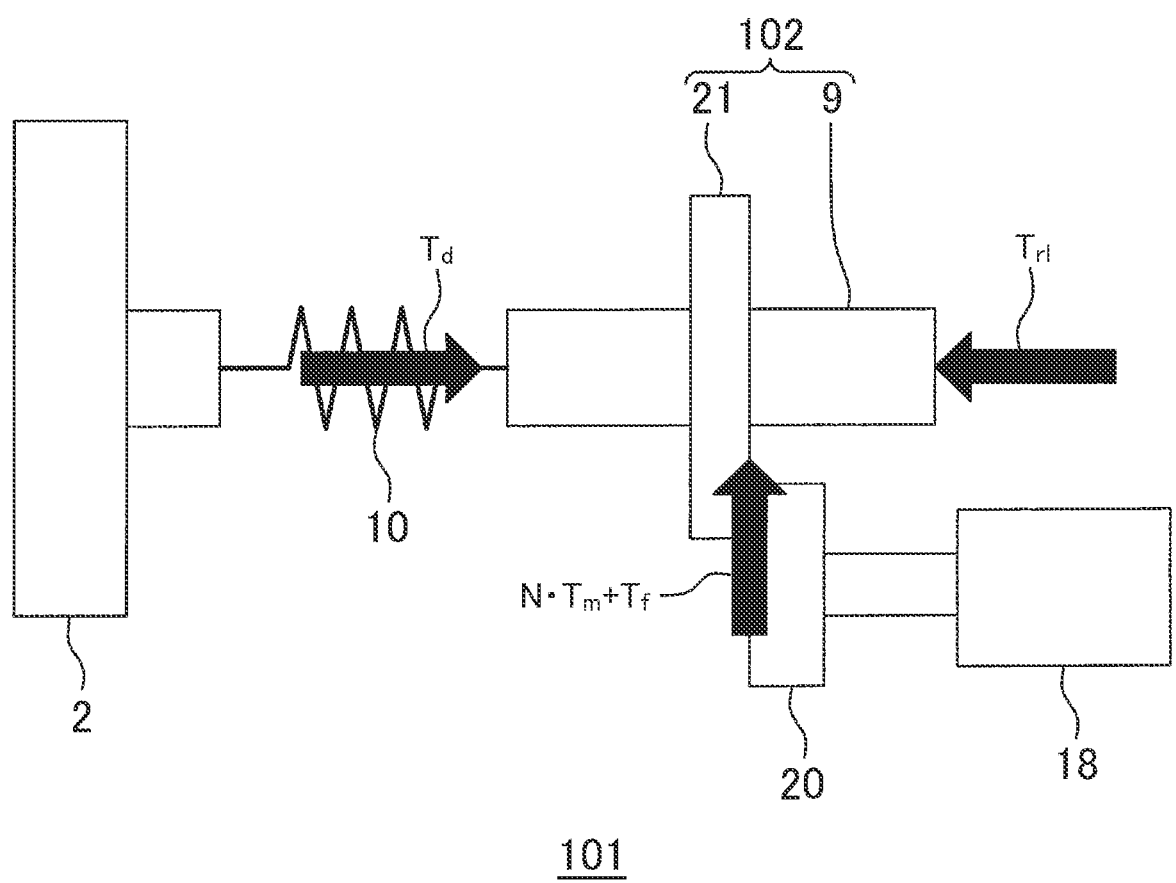
FIG. 7 is a schematic diagram illustrating an example of the configuration of a physical model of the electric power steering system.

The equation of state for the physical model 101 in FIG. 7 is represented by the following formula (4).

$$\begin{cases} \dot{x} = Ax + B_1 u_1 + B_2 u_2 \\ y = Cx + Du_1 \end{cases} \quad (4)$$

In the formula (4), x is a state variable vector. In the formula (4), $u_1$ is a known input vector. In the formula (4), $u_2$ is an unknown input vector. In the formula (4), y is an output vector (measurement value). In the formula (4), A is a system matrix. In the formula (4), $B_1$ is a first input matrix. In the formula (4), $B_2$ is a second input matrix. In the formula (4), C is an output matrix. In the formula (4), D is a direct matrix.

The above equation of state is extended to a system that includes the unknown input vector $u_2$ as one state. The equation of state for the extended system (extended equation of state) is represented by the following formula (5).

$$\begin{cases} \dot{x}_e = A_e x_e + B_e u_1 \\ y = C_e x_e \end{cases} \quad (5)$$

In the formula (5), $x_e$ is a state variable vector for the extended system, and is represented by the following formula (6).

$$x_e = \begin{bmatrix} x \\ u_2 \end{bmatrix} \quad (6)$$

In the formula (5), $A_e$ is a system matrix for the extended system. In the formula (5), $B_e$ is a known input matrix for the extended system. In the formula (5), $C_e$ is an output matrix for the extended system.

A disturbance observer (extended state observer) represented by the following equation (7) is constructed from the extended equation of state of the formula (5).

$$\begin{cases} \dot{\hat{x}}_e = A_e \hat{x}_e + B_e u_1 + L(y - \hat{y}) \\ \hat{y} = C_e \hat{x}_e \end{cases} \quad (7)$$

In the formula (7), $\hat{x}_e$ represents an estimated value of $x_e$. L is an observer gain. $\hat{y}$ represents an estimated value of y. $\hat{x}_e$ is represented by the following formula (8).

$$\hat{x}_e = \begin{bmatrix} \hat{\theta} \\ \dot{\hat{\theta}} \\ \hat{T}_{lc} \end{bmatrix} \quad (8)$$

In the formula (8), $\hat{\theta}$ is an estimated value of $\theta$, and $\hat{T}_{lc}$ is an estimated value of $T_{lc}$.

The disturbance torque estimation unit 64 computes the state variable vector $\hat{x}_e$ on the basis of the equation of the formula (7).

Figure 8:
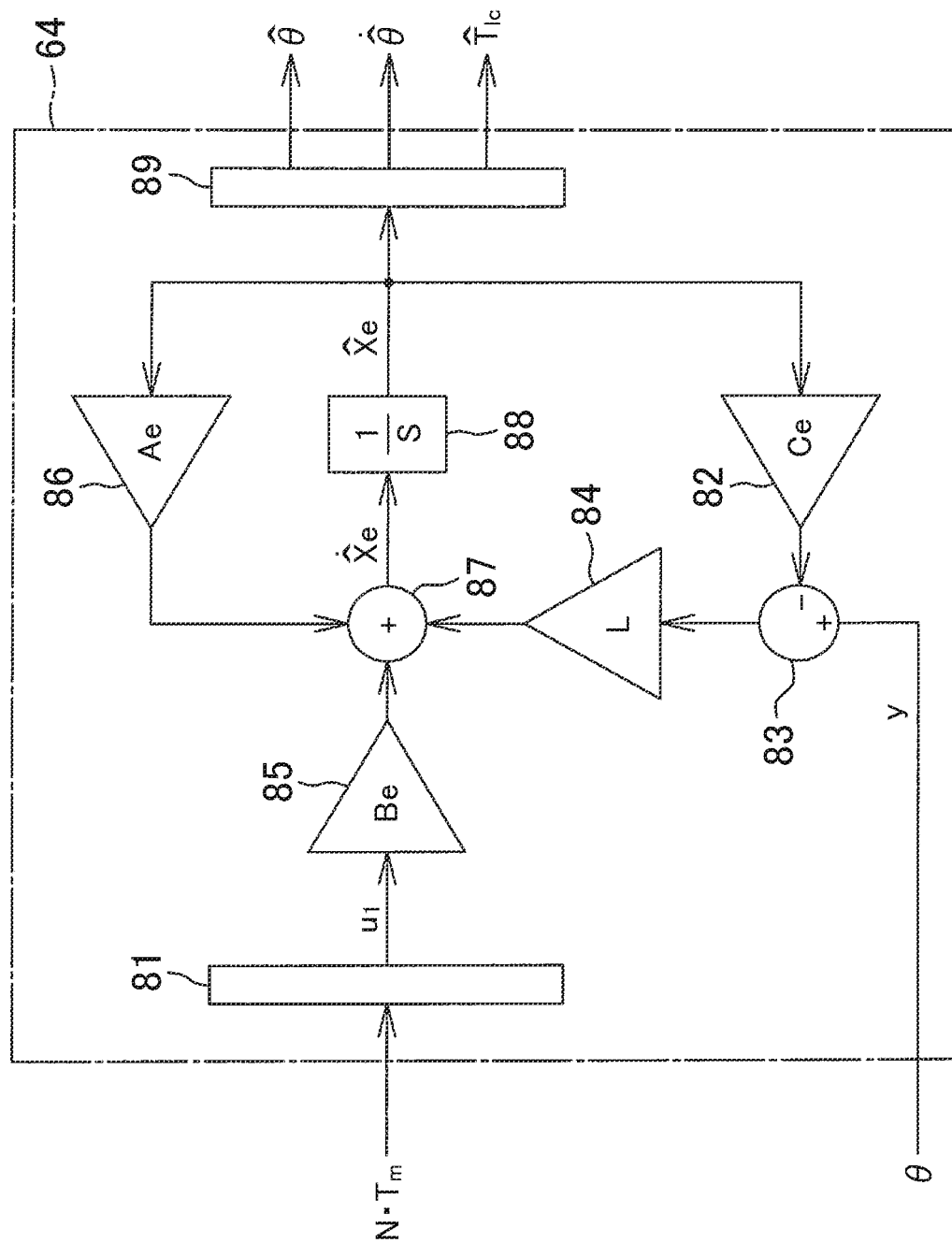
FIG. 8 is a block diagram illustrating the configuration of a disturbance torque estimation unit.

FIG. 8 is a block diagram illustrating the configuration of the disturbance torque estimation unit 64. The disturbance torque estimation unit 64 includes an input vector input unit 81, an output matrix multiplication unit 82, a first addition unit 83, a gain multiplication unit 84, an input matrix multiplication unit 85, a system matrix multiplication unit 86, a second addition unit 87, an integration unit 88, and a state variable vector output unit 89. The steering torque command value $T_{cmd}$ (=$N \cdot T_m$) that is computed by the speed reduction ratio multiplication unit 68 (see FIG. 6), is provided to the input vector input unit 81. The input vector input unit 81 outputs the input vector $u_1$.

The output from the integration unit 88 is the state variable vector $\hat{x}_e$ (see the formula (8)). When the computation is started, an initial value of the state variable vector $\hat{x}_e$ is provided. The initial value of the state variable vector $\hat{x}_e$ is zero, for example. The system matrix multiplication unit 86 multiplies the state variable vector $\hat{x}_e$ by the system matrix $A_e$. The output matrix multiplication unit 82 multiplies the state variable vector $\hat{x}_e$ by the output matrix $C_e$.

The first addition unit 83 subtracts the output ($C_e \cdot \hat{x}_e$) of the output matrix multiplication unit 82 from the output vector (measurement value) y that is the actual steering angle $\theta$ that is computed by the second speed reduction ratio division unit 70 (see FIG. 6). That is, the first addition unit 83 computes the difference (y−$\hat{y}$) between the output vector y and an estimated output vector value $\hat{y}$ (=$C_e \cdot \hat{x}_e$). The gain multiplication unit 84 multiplies the output (y−$\hat{y}$) from the first addition unit 83 by the observer gain L (see the formula (7)).

The input matrix multiplication unit 85 multiplies the input vector $u_1$ that is output from the input vector input unit 81, by the input matrix $B_e$. The second addition unit 87 adds the output ($B_e \cdot u_1$) from the input matrix multiplication unit 85, the output ($A_e \cdot \hat{x}_e$) from the system matrix multiplication unit 86, and the output (L(y−$\hat{y}$)) from the gain multiplication unit 84. Consequently, a differential value $d\hat{x}_e/dt$ of the state variable vector is computed. The integration unit 88 integrates the output ($d\hat{x}_e/dt$) from the second addition unit 87. Consequently, the state variable vector $\hat{x}_e$ is computed. The state variable vector output unit 89 computes the estimated disturbance torque value $\hat{T}_{lc}$, the estimated steering angle value $\hat{\theta}$, and the estimated angular velocity value $d\hat{\theta}/dt$ on the basis of the state variable vector $\hat{x}_e$.

A common disturbance observer is composed of an inverse model of a plant and a low-pass filter, unlike the extended state observer discussed earlier. The equation of motion of the plant is represented by the formula (3) as discussed earlier. Thus, the inverse model of the plant is as indicated by the following formula (9).

$$T_{lc} = J \cdot \ddot{\theta} - N \cdot T_m \quad (9)$$

An input to the common disturbance observer is $J \cdot d^2\theta/dt^2$ and $N \cdot T_m$ and uses a second-order differential value of the actual steering angle $\theta$, and therefore is significantly affected by noise of the rotational angle sensor 23. With the extended state observer according to the embodiment discussed earlier, in contrast, disturbance torque is estimated through integration, and therefore the effect of noise due to differentiation can be reduced.

Figure 9:
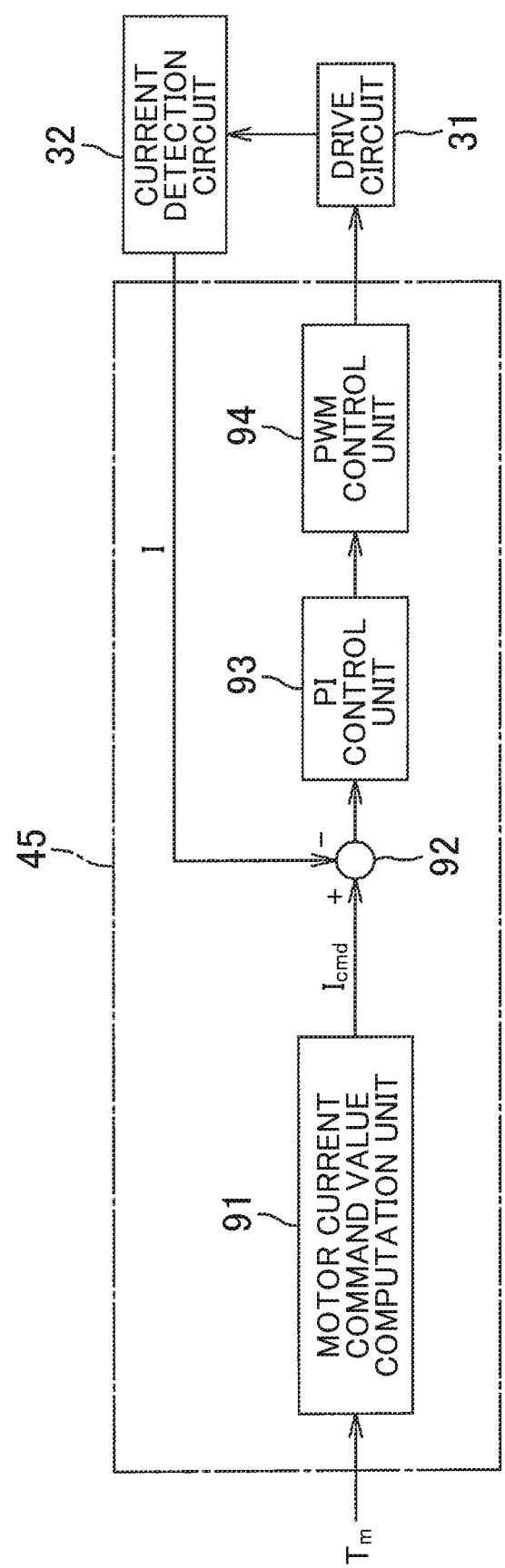
FIG. 9 is a schematic diagram illustrating the configuration of a torque control unit.

A common disturbance observer composed of an inverse model of a plant and a low-pass filter may also be used as the disturbance torque estimation unit 64. FIG. 9 is a schematic diagram illustrating the configuration of the torque control unit 45. The torque control unit 45 (see FIG. 2) includes a motor current command value computation unit 91, a current deviation computation unit 92, a PI control unit 93, and a pulse width modulation (PWM) control unit 94.

The motor current command value computation unit 91 divides the motor torque command value $T_m$ that is computed by the angle control unit 44 (see FIG. 2), by a torque constant Kt of the electric motor 18. Consequently, a motor current command value $I_{cmd}$ is computed. The current deviation computation unit 92 computes a deviation $\Delta I$ (=$I_{cmd}$−I) between the motor current command value $I_{cmd}$ that is obtained by the motor current command value computation unit 91, and the motor current I that is detected by the current detection circuit 32.

The PI control unit 93 performs proportional-integral (PI) computation on the current deviation $\Delta I$ that is computed by the current deviation computation unit 92. Consequently, a drive command value for bringing the motor current I, which flows through the electric motor 18, to the motor current command value $I_{cmd}$ is generated. The PWM control unit 94 generates a PWM control signal with a duty ratio corresponding to the drive command value, and supplies the generated PWM control signal to the drive circuit 31. Consequently, electric power corresponding to the drive command value is supplied to the electric motor 18.

Figure 10A:
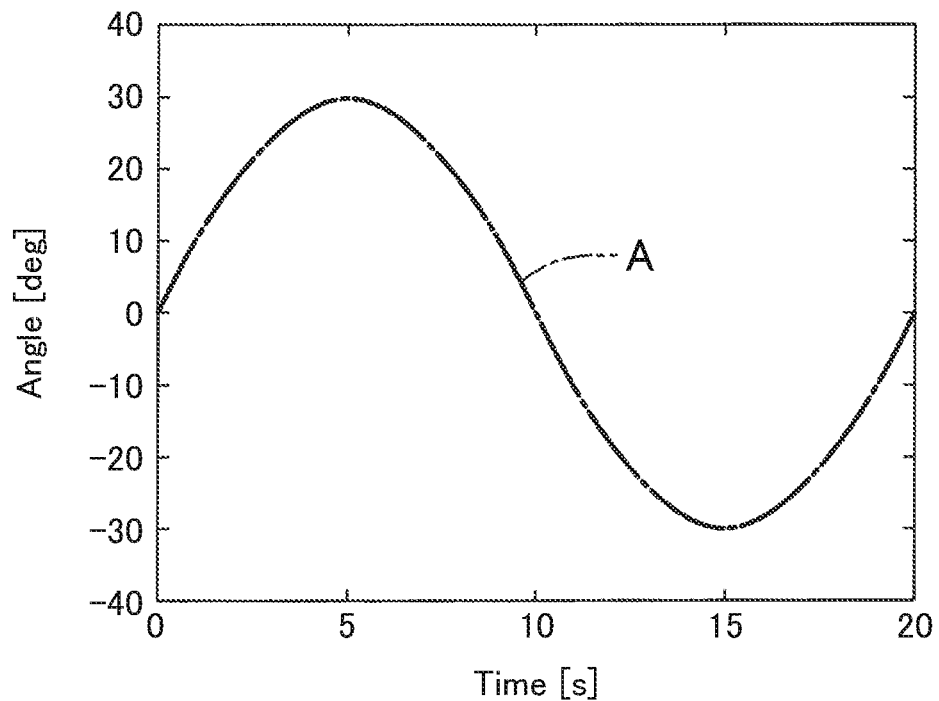
FIG. 10A is a graph indicating an automatic steering command value $\theta_{adac}$.

A simulation was performed to find out how the integrated angle command value $\theta_{acmd}$ was varied when the steering wheel 2 was operated by the driver while automatic steering control was performed. Specifically, a simulation was performed for a case where the steering torque $T_d$ such as that indicated by a polygonal line B in FIG. 10B was applied to the steering wheel 2 by manual steering when the automatic steering command value $\theta_{adac}$ such as that indicated by a curve A in FIG. 10A was provided from the higher-level ECU 201 to the motor control ECU 202.

Figure 10B:
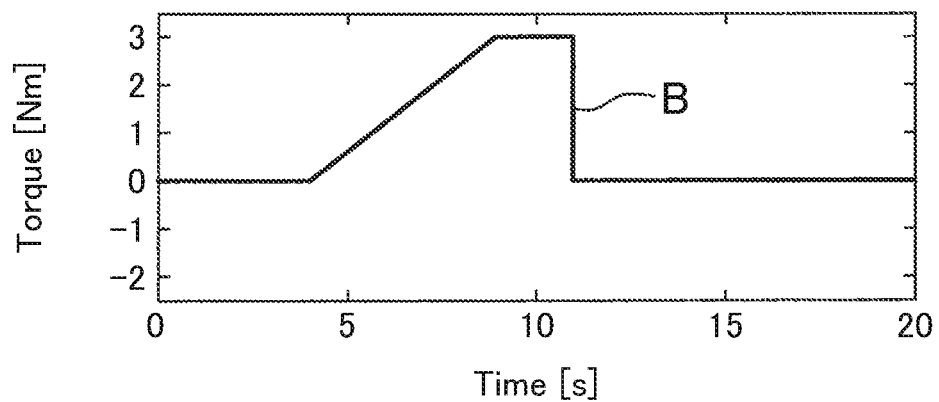
FIG. 10B is a graph indicating the steering torque $T_d$ that is applied to a steering wheel by manual steering.
Figure 11:
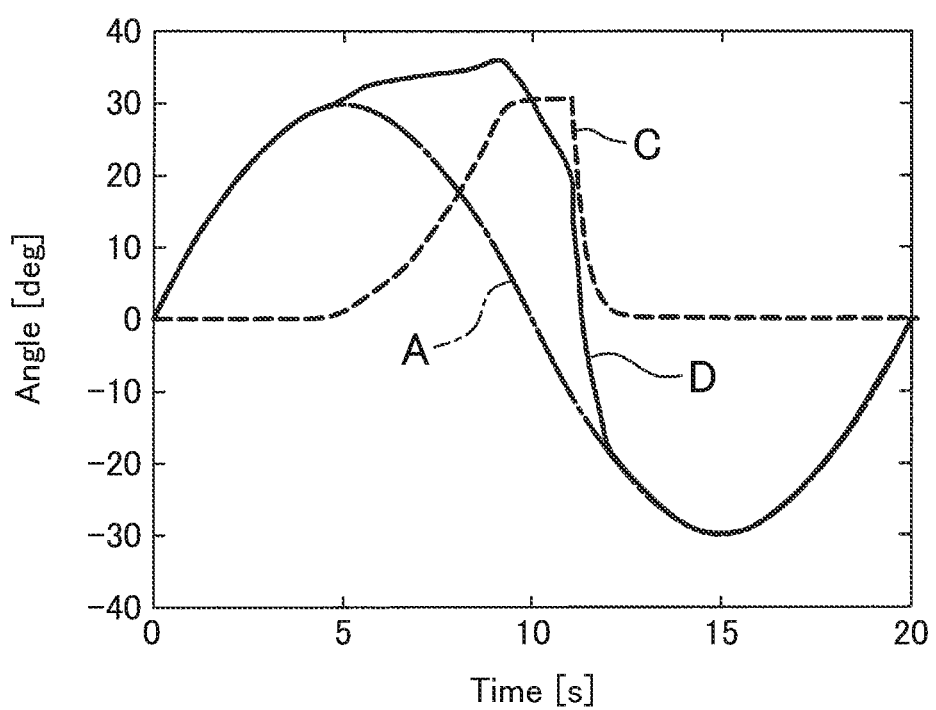
FIG. 11 is a graph indicating variations in a manual steering command value $\theta_{mdac}$ and an integrated angle command value $\theta_{acmd}$ for a case where the automatic steering command value and the steering torque are varied as indicated in FIGS. 10A and 10B, respectively.

The steering torque $T_d$ such as that indicated by the line B in FIG. 10B was applied to the steering wheel 2. Consequently, the manual steering command value $\theta_{mdac}$ was varied as indicated by a curve C in FIG. 11. Consequently, the integrated angle command value $\theta_{acmd}$ was varied as indicated by a curve D in FIG. 11. That is, when manual steering is performed while automatic steering control is performed, the integrated angle command value $\theta_{acmd}$ deviates from the automatic steering command value $\theta_{adac}$ as the absolute value of the manual steering command value $\theta_{mdac}$ becomes larger. When manual steering is stopped, on the other hand, the absolute value of the manual steering command value $\theta_{mdac}$ is reduced to substantially zero. Consequently, the integrated angle command value $\theta_{acmd}$ gradually approximates the automatic steering command value $\theta_{adac}$ to be equal to the automatic steering command value $\theta_{adac}$. Thus, coordinated control in which steering control is performed mainly through automatic steering control while enabling manual steering can be achieved.

In the embodiment discussed earlier, the manual steering command value $\theta_{mdac}$ is added to the automatic steering command value $\theta_{adac}$ to compute the integrated angle command value $\theta_{acmd}$. The electric motor 18 is controlled on the basis of the integrated angle command value $\theta_{acmd}$. Consequently, coordinated control in which steering control is performed mainly through automatic steering control while enabling manual steering can be achieved without switching between manual steering control and automatic steering control. In addition, a seamless transition can be made between manual steering control and automatic steering control, and thus a sense of discomfort is not provided to the driver when manual steering is performed.

In the embodiment discussed earlier, the basic torque command value $(T_{fb}+T_{ff})$ is computed on the basis of the integrated angle command value $\theta_{acmd}$. The basic torque command value $(T_{fb}+T_{ff})$ is corrected in accordance with the estimated disturbance torque value $\hat{T}_{lc}$ that is computed by the disturbance torque estimation unit 64. As a result, the effect of the disturbance torque on the angle control performance is suppressed. Consequently, it is possible to achieve high-precision angle control. Consequently, in addition, it is possible to eliminate the effect of the angle control unit 44 on the steering feel when manual steering is performed during automatic steering control, and thus design of the steering feel is facilitated. Specifically, a steering feel that matches design values of the spring constant k and the viscous damping coefficient c can be obtained, and thus design of the steering feel is facilitated.

Figure 12:
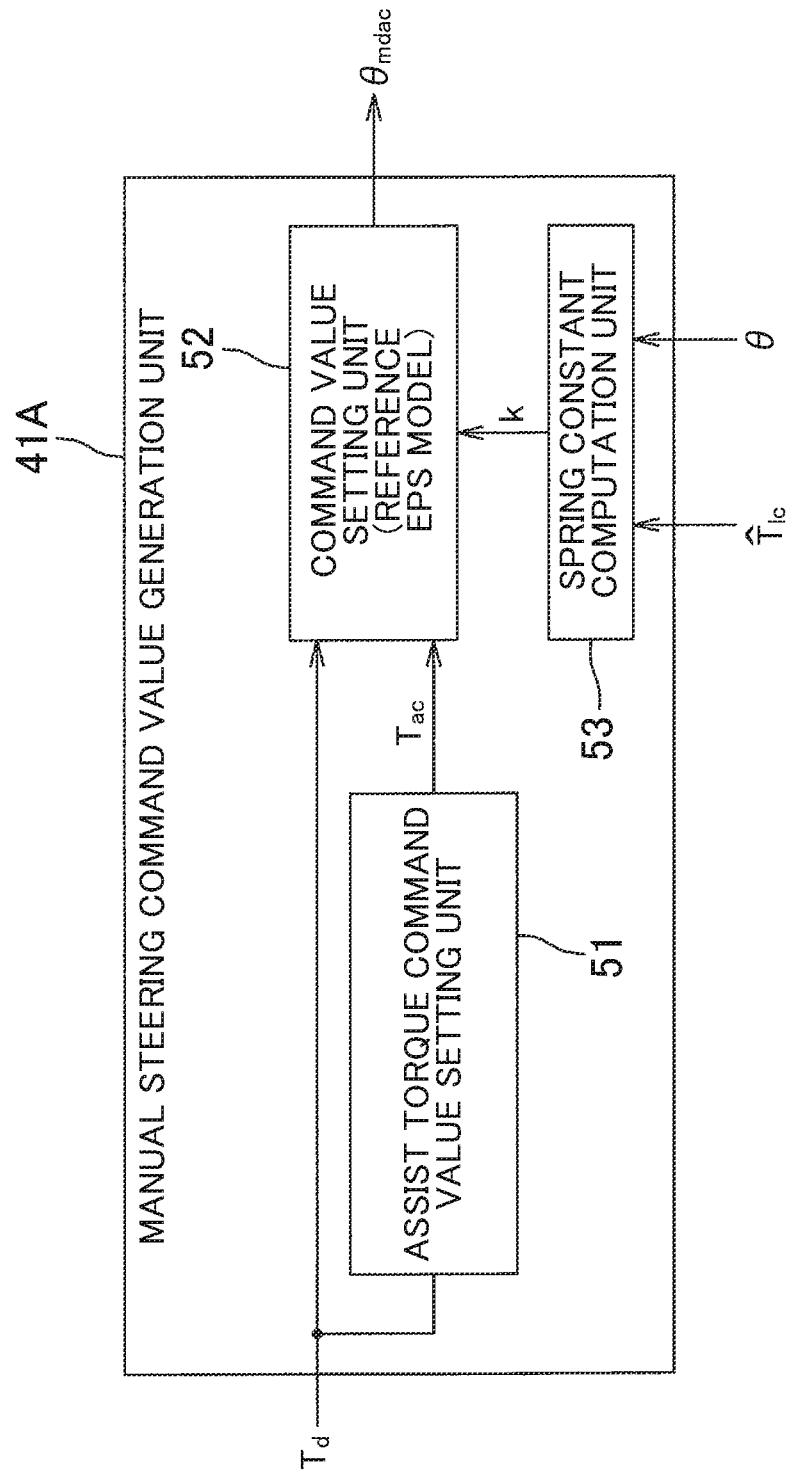
FIG. 12 is a block diagram illustrating a first modification of the manual steering command value generation unit.

FIG. 12 is a block diagram illustrating a first modification of the manual steering command value generation unit. In FIG. 12, units corresponding to the units in FIG. 3 discussed earlier are given the same reference numerals as in FIG. 3. A manual steering command value generation unit 41A includes a spring constant computation unit 53 in addition to the assist torque command value setting unit 51 and the command value setting unit 52. The spring constant computation unit 53 computes the spring constant k on the basis of the estimated disturbance torque value $T_{lc}$ that is computed by the disturbance torque estimation unit 64 (see FIG. 6), and the actual steering angle θ that is computed by the second speed reduction ratio division unit 70. Specifically, the spring constant computation unit 53 computes the spring constant k on the basis of the following formula (11).

$$k=\hat{T}_{lc}/\theta \tag{11}$$

The viscous damping coefficient c in the formula (2) discussed earlier is set in advance as in the embodiment discussed earlier.

The command value setting unit 52 solves the differential equation of the formula (2) by using k that is computed using the formula (11) and c that is set in advance as k and c, respectively, in the formula (2) discussed earlier. Consequently, θc is computed, and the obtained θc is set as the manual steering command value $\theta_{mdac}$.

Figure 13:
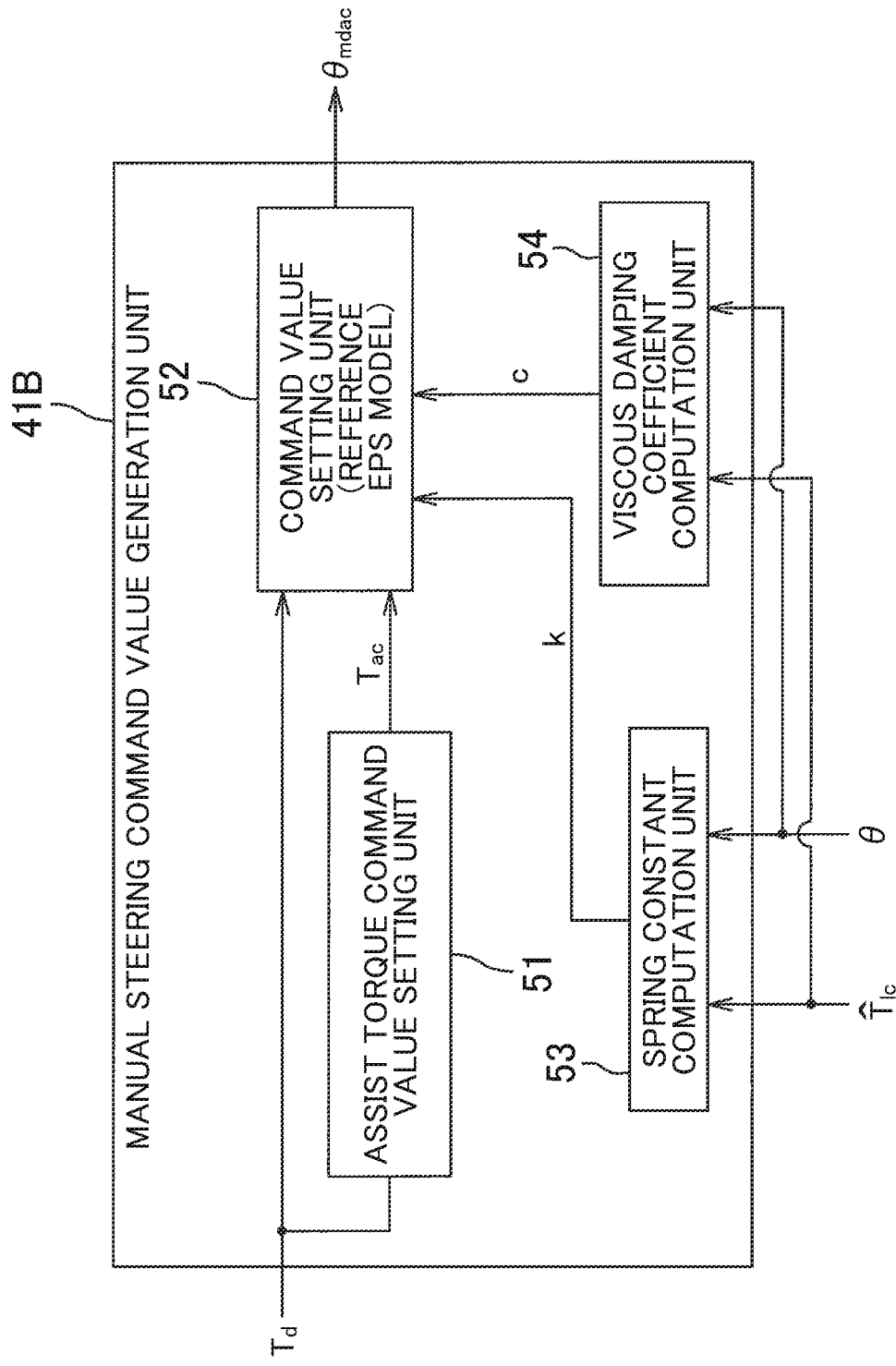
FIG. 13 is a block diagram illustrating a second modification of the manual steering command value generation unit.

In the manual steering command value generation unit 41A according to the first modification, the spring constant k is computed using the estimated disturbance torque value $T_{lc}$ that is computed by the disturbance torque estimation unit 64. Consequently, a steering feel that matches the actual road surface load is obtained. FIG. 13 is a block diagram illustrating a second modification of the manual steering command value generation unit. In FIG. 13, units corresponding to the units in FIG. 3 discussed earlier are given the same reference numerals as in FIG. 3.

A manual steering command value generation unit 41B includes the spring constant computation unit 53 and a damping coefficient computation unit 54 in addition to the assist torque command value setting unit 51 and the command value setting unit 52. The spring constant computation unit 53 computes the spring constant k on the basis of the formula (11) as with the spring constant computation unit 53 according to the first modification. The damping coefficient computation unit 54 computes the viscous damping coefficient c on the basis of the estimated disturbance torque value $T_{lc}$ that is computed by the disturbance torque estimation unit 64 (see FIG. 6), and the actual steering angle θ that is computed by the second speed reduction ratio division unit 70. Specifically, the damping coefficient computation unit 54 computes the viscous damping coefficient c on the basis of the following formula (12).

$$c=\hat{T}_{lc}/(d\theta/dt) \tag{12}$$

The command value setting unit 52 computes θc by solving the differential equation of the formula (2) by using k that is computed using the formula (11) and c that is computed using the formula (12) as k and c, respectively, in the formula (2) discussed earlier, and sets the obtained θc as the manual steering command value $\theta_{mdac}$. In the manual steering command value generation unit 41B according to the second modification, the spring constant k and the viscous damping coefficient c are computed using the estimated disturbance torque value $T_{lc}$ that is computed by the disturbance torque estimation unit 64. Consequently, a steering feel that matches the actual road surface load is obtained.

Figure 14:
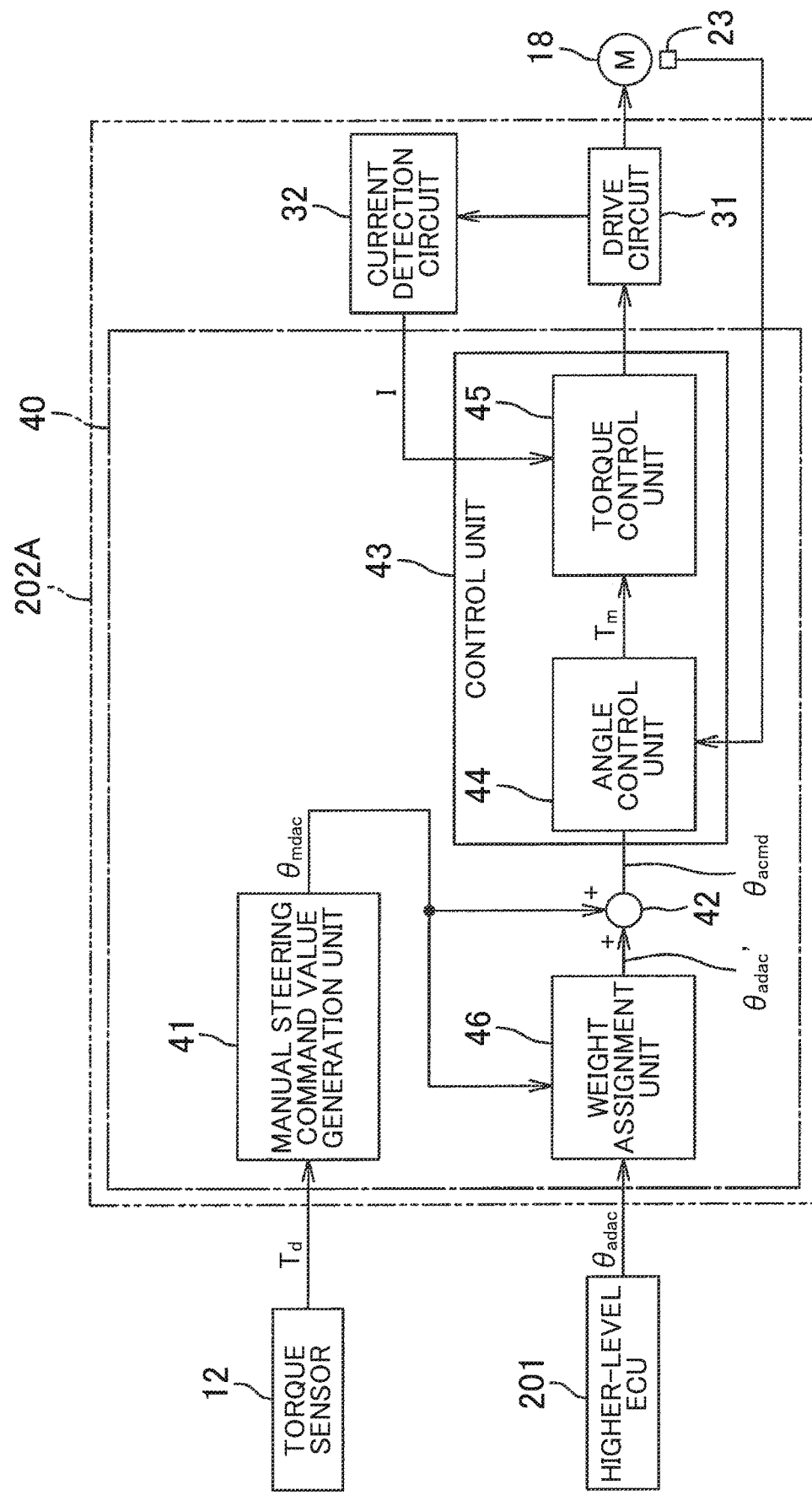
FIG. 14 is a block diagram illustrating a first modification of the motor control ECU.

FIG. 14 is a block diagram illustrating a first modification of the motor control ECU. In FIG. 14, units corresponding to the units in FIG. 2 discussed earlier are given the same reference numerals as in FIG. 2. In the following description, a steering mode in which the electric motor 18 is controlled on the basis of only the automatic steering command value $\theta_{adac}$ will be referred to as an automatic steering mode. A steering mode in which the electric motor 18 is controlled on the basis of only the manual steering command value $\theta_{mdac}$ will be referred to as a manual steering mode.

A motor control ECU 202A in FIG. 14 differs from the motor control ECU 202 in FIG. 2 in being provided with a weight assignment unit 46 that performs a weight assignment process on the automatic steering command value $\theta_{adac}$ that is provided from the higher-level ECU 201. The weight assignment unit 46 is an example of a "first weight assignment unit according to the present invention". The weight assignment unit 46 performs a weight assignment process on the automatic steering command value $\theta_{adac}$ in accordance with the manual steering command value $\theta_{mdac}$ that is generated by the manual steering command value generation unit 41.

Specifically, the weight assignment unit 46 first sets a weight $W_{ad}$ on the basis of the manual steering command value $\theta_{mdac}$. Next, the weight assignment unit 46 multiplies the automatic steering command value $\theta_{adac}$ that is input from the higher-level ECU 201, by the weight $W_{ad}$. Then, the weight assignment unit 46 provides the product $W_{ad} \cdot \theta_{adac}$ to the integrated angle command value computation unit 42 as an automatic steering command value $\theta_{adac}'$ after the weight assignment process.

Figure 15:
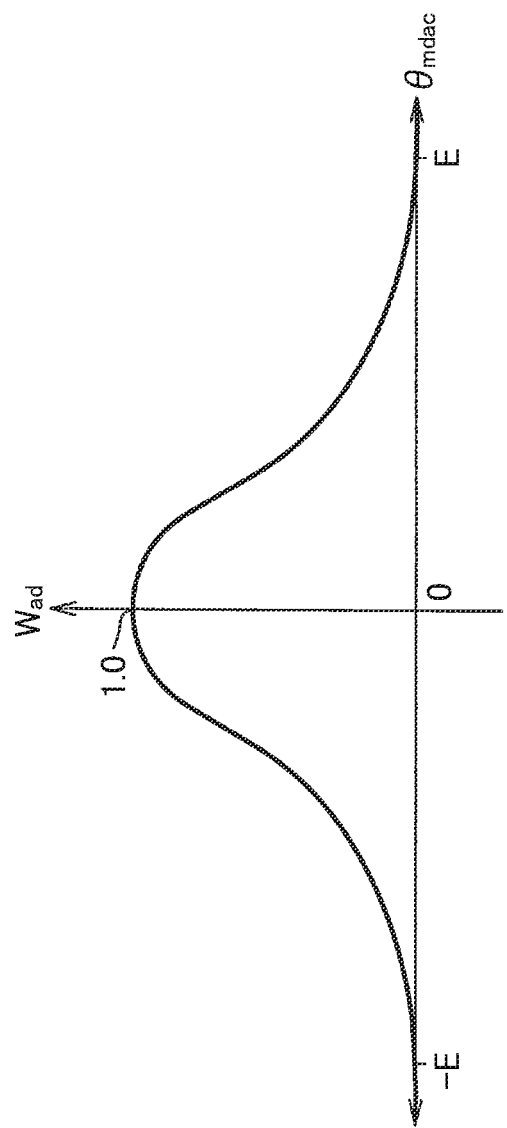
FIG. 15 is a graph indicating an example of a weight $W_{ad}$ set with respect to the manual steering command value $\theta_{mdac}$.

The integrated angle command value computation unit 42 adds the automatic steering command value $\theta_{adac}'$ after the weight assignment process by the weight assignment unit 46 to the manual steering command value $\theta_{mdac}$ that is generated by the manual steering command value generation unit 41. Consequently, the integrated angle command value $\theta_{acmd}$ is computed. The weight $W_{ad}$ that is set by the weight assignment unit 46 will be described. An example of the weight $W_{ad}$ that is set with respect to the manual steering command value $\theta_{mdac}$ is illustrated in FIG. 15. The weight $W_{ad}$ is set to a value in the range of 0 to 1.0 in accordance with the manual steering command value $\theta_{mdac}$. The weight $W_{ad}$ is set to 1.0 when the manual steering command value $\theta_{mdac}$ is zero. Meanwhile, the weight $W_{ad}$ is set to zero when the absolute value of the manual steering command value $\theta_{mdac}$ is equal to or more than a predetermined value E (E>0). The weight $W_{ad}$ is set so as to be gradually decreased non-linearly along with an increase in the absolute value of the manual steering command value $\theta_{mdac}$ and gradually increased non-linearly along with a reduction in the absolute value of the manual steering command value $\theta_{mdac}$ when the absolute value of the manual steering command value $\theta_{mdac}$ is in the range of 0 to E. The predetermined value E is set in advance through an experiment, analysis, etc.

The weight $W_{ad}$ may be set so as to be gradually decreased linearly along with an increase in the absolute value of the manual steering command value $\theta_{mdac}$ and gradually increased linearly along with a reduction in the absolute value of the manual steering command value $\theta_{mdac}$ when the absolute value of the manual steering command value $\theta_{mdac}$ is in the range of 0 to E. In the motor control ECU 202A, the automatic steering command value $\theta_{adac}$ that is input from the higher-level ECU 201, is provided, as it is, to the integrated angle command value computation unit 42 when the manual steering command value $\theta_{mdac}$ is zero. In this case, the electric motor 18 is controlled on the basis of only the automatic steering command value $\theta_{adac}$, and thus the steering mode is the automatic steering mode.

When the absolute value of the manual steering command value $\theta_{mdac}$ is equal to or more than the predetermined value E, on the other hand, the automatic steering command value $\theta_{adac}$ is zero. In this case, the electric motor 18 is controlled on the basis of only the manual steering command value $\theta_{mdac}$, and thus the steering mode is the manual steering mode. That is, the motor control ECU 202A makes it possible to set the steering mode to the automatic steering mode, in which the electric motor 18 is controlled on the basis of only the automatic steering command value $\theta_{adac}$, and the manual steering mode, in which the electric motor 18 is controlled on the basis of only the manual steering command value $\theta_{mdac}$. Switching between the automatic steering mode and the manual steering mode is made on the basis of the manual steering command value $\theta_{mdac}$ that is calculated using the steering torque $T_d$. Consequently, switching between the steering modes can be made by a steering operation by the driver.

In addition, the absolute value of the automatic steering command value $\theta_{adac}$ is gradually decreased to zero when the steering mode is switched from the automatic steering mode to the manual steering mode, and the absolute value of the automatic steering command value $\theta_{adac}$ is gradually increased from zero when the steering mode is switched from the manual steering mode to the automatic steering mode. Therefore, the motor control ECU 202A makes it possible to smoothly switch between the automatic steering mode and the manual steering mode.

In the first modification, a weight assignment process is performed on the automatic steering command value $\theta_{adac}$ in accordance with the manual steering command value $\theta_{mdac}$. However, the present invention is not limited thereto. For example, a weight assignment process may be performed on the automatic steering command value $\theta_{adac}$ in accordance with the steering torque $T_d$. Specifically, a similar effect to that of the first modification can be achieved by inputting the steering torque $T_d$ that is detected by the torque sensor 12, to the weight assignment unit 46 and setting the weight $W_{ad}$ on the basis of a graph which is similar to that in FIG. 15 and in which the horizontal axis indicates the steering torque $T_d$.

Figure 16:
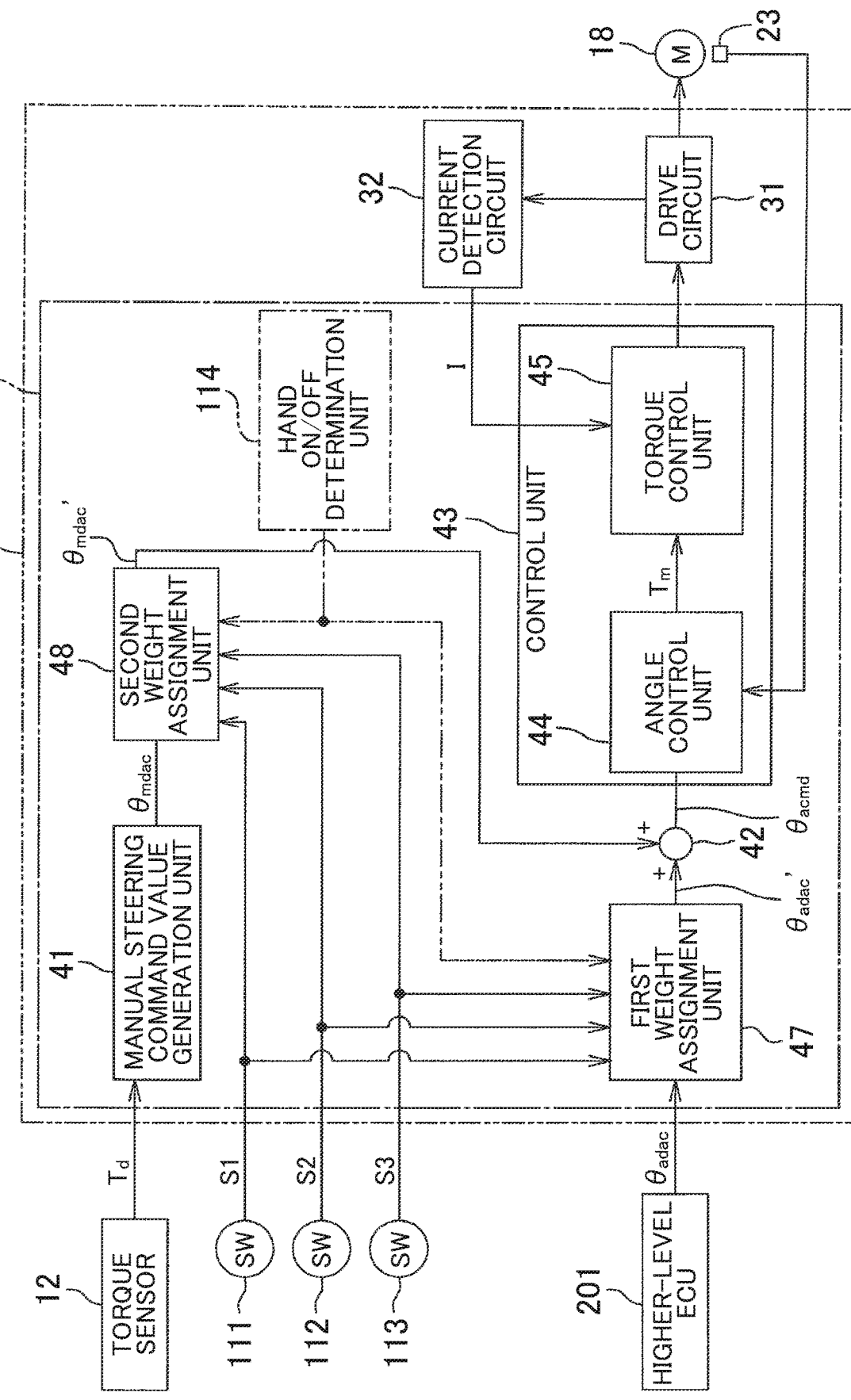
FIG. 16 is a block diagram illustrating a second modification of the motor control ECU.

FIG. 16 is a block diagram illustrating a second modification of the motor control ECU. In FIG. 16, units corresponding to the units in FIG. 2 discussed earlier are given the same reference numerals as in FIG. 2. A motor control ECU 202B in FIG. 16 differs from the motor control ECU 202 in FIG. 2 in that mode setting signals from first, second, and third mode switches 111, 112, and 113 are input, and in being provided with a first weight assignment unit 47 and a second weight assignment unit 48.

The first weight assignment unit 47 is an example of a "third weight assignment unit according to the present invention". The second weight assignment unit 48 is an example of a "fourth weight assignment unit according to the present invention". The first mode switch 111 outputs a normal steering mode setting signal S1 for setting the steering mode to a normal steering mode when turned on by the driver. In the normal steering mode, the electric motor 18 is controlled on the basis of the manual steering command value $\theta_{mdac}$ and the automatic steering command value $\theta_{adac}$, as with the motor control ECU 202 in FIG. 2.

The second mode switch 112 outputs an automatic steering mode setting signal S2 for setting the steering mode to the automatic steering mode when turned on by the driver. The third mode switch 113 outputs a manual steering mode setting signal S3 for setting the steering mode to the manual steering mode when turned on by the driver. The mode setting signals S1, S2, and S3 are provided to the first and second weight assignment units 47 and 48.

The first weight assignment unit 47 performs a first weight assignment process on the automatic steering command value $\theta_{adac}$ that is input from the higher-level ECU 201, in accordance with the input mode setting signal. Specifically, when any of the mode setting signals S1, S2, and S3 is input, the first weight assignment unit 47 first sets a first weight $W_{ad}$ in accordance with the current steering mode and the input mode setting signal. Next, the first weight assignment unit 47 multiplies the automatic steering command value $\theta_{adac}$ that is input from the higher-level ECU 201, by the first weight $W_{ad}$. Then, the first weight assignment unit 47 provides the product $W_{ad} \cdot \theta_{adac}$ to the integrated angle command value computation unit 42 as an automatic steering command value $\theta_{adac}'$ after the first weight assignment process.

The second weight assignment unit 48 is provided between the manual steering command value generation unit 41 and the integrated angle command value computation unit 42. The second weight assignment unit 48 performs a second weight assignment process on the manual steering command value $\theta_{mdac}$ that is generated by the manual steering command value generation unit 41, in accordance with the input mode setting signal. Specifically, when any of the mode setting signals S1, S2, and S3 is input, the second weight assignment unit 48 first sets a second weight $W_{md}$ in accordance with the current steering mode and the input mode setting signal. Next, the second weight assignment unit 48 multiplies the manual steering command value $\theta_{mdac}$ that is input from the manual steering command value generation unit 41, by the second weight $W_{md}$. Then, the second weight assignment unit 48 provides the product $W_{md} \cdot \theta_{mdac}$ to the integrated angle command value computation unit 42 as a manual steering command value $\theta_{mdac}'$ after the second weight assignment process.

The integrated angle command value computation unit 42 computes an integrated angle command value $\theta_{acmd}$ by adding the automatic steering command value $\theta_{adac}'$ after the first weight assignment process and the manual steering command value $\theta_{mdac}'$ after the second weight assignment process. In the second modification, the first weight $W_{ad}$ and the second weight $W_{md}$ are 1.0 in the case where the steering mode is set to the normal steering mode. In the case where the steering mode is set to the automatic steering mode, the first weight $W_{ad}$ is 1.0, and the second weight $W_{md}$ is zero. In the case where the steering mode is set to the manual steering mode, the first weight $W_{ad}$ is zero, and the second weight $W_{md}$ is 1.0. That is, the motor control ECU 202B makes it possible to switch the steering mode among the normal steering mode, the automatic steering mode, and the manual steering mode by an operation on the mode switches 111, 112, and 113 by the driver.

Figure 17:
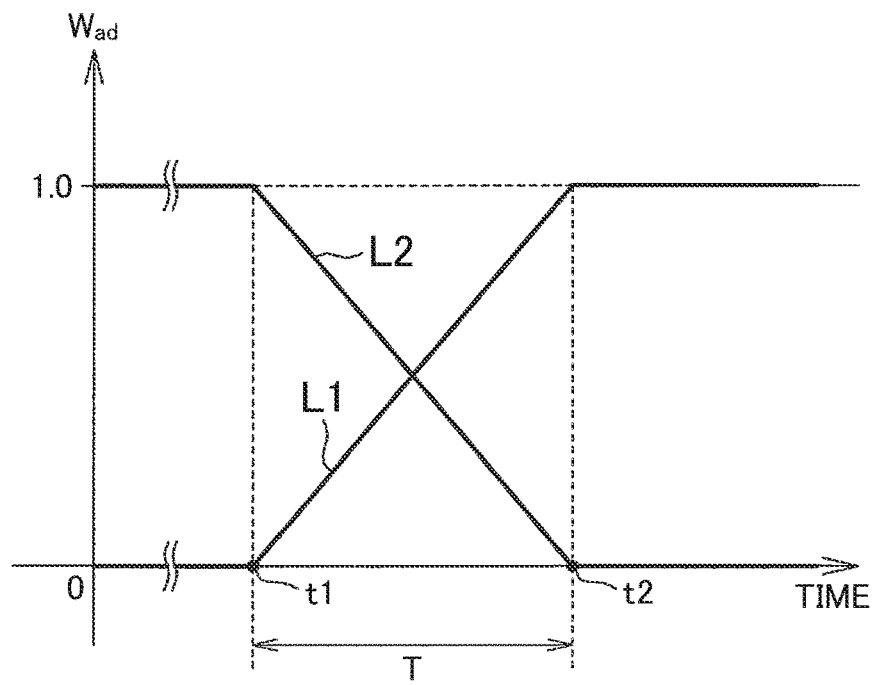
FIG. 17 is a graph indicating an example of a first weight $W_{ad}$ set when each of mode setting signals S1, S2, and S3 is input.
Figure 18:
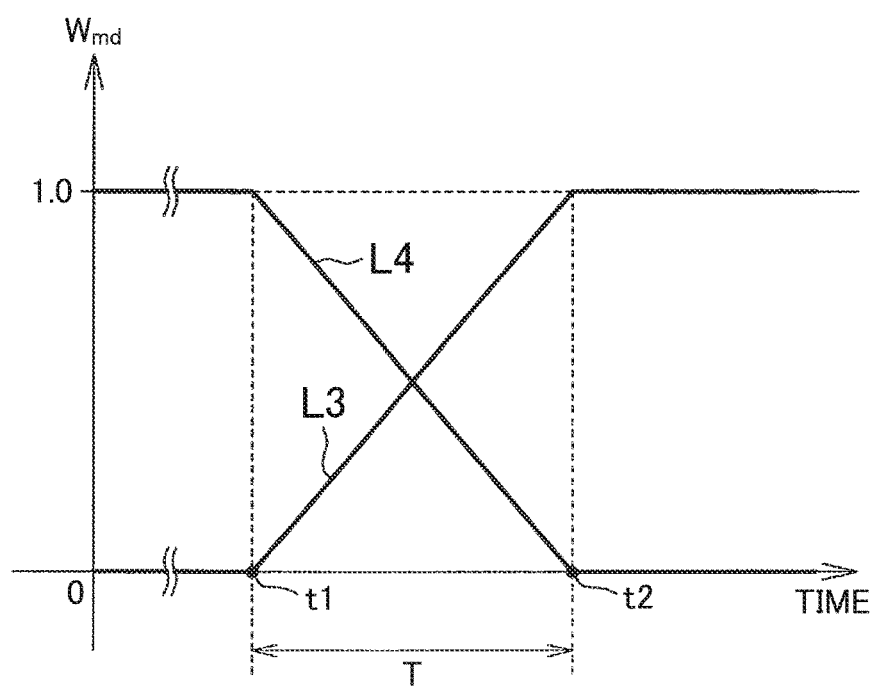
FIG. 18 is a graph indicating an example of a second weight $W_{md}$ set when each of the mode setting signals S1, S2, and S3 is input.

An example of the first weight $W_{ad}$ and the second weight $W_{md}$ that are set when the steering mode is switched is indicated in FIGS. 17 and 18, respectively. In FIG. 17, the first weight $W_{ad}$ that is gradually increased from zero to 1.0 since the mode setting signal S1, S2, S3 is input (time t1) until a predetermined time T elapses at time t2 is indicated by a polygonal line L1, and the first weight $W_{ad}$ that is gradually decreased from 1.0 to zero is indicated by a polygonal line L2. In FIG. 18, meanwhile, the second weight $W_{md}$ that is gradually increased from zero to 1.0 since time t1 until t2 is indicated by a polygonal line L3, and the second weight $W_{md}$ that is gradually decreased from 1.0 to zero is indicated by a polygonal line L4. Consequently, the respective absolute values of the automatic steering command value $\theta_{adac}'$ after the first weight assignment process and the manual steering command value $\theta_{mdac}'$ after the second weight assignment process are gradually increased or gradually decreased. Therefore, the steering mode is switched smoothly.

The time T that is required to switch the first weight $W_{ad}$ and the second weight $W_{md}$ between zero and 1.0 is set to a predetermined value calculated in advance through an experiment, analysis, etc. The time T that is required to switch the first weight $W_{ad}$ between zero and 1.0 and the time T that is required to switch the second weight $W_{md}$ between zero and 1.0 may be set differently. In addition, the first weight $W_{ad}$ and the second weight $W_{md}$ may be set so as to be gradually increased and gradually decreased non-linearly, rather than linearly.

In the second modification, an operation of the mode switch 111, 112, 113 which does not cause a change in the steering mode is rendered invalid. In the second modification, in addition, an operation of any of the mode switches 111, 112, and 113 which is performed before the predetermined time T elapses since the mode switch 111, 112, and 113 is operated is rendered invalid.

The automatic steering mode setting signal S2 or the manual steering mode setting signal S3 may be generated in accordance with whether the driver is grasping or has released the steering wheel 2. Specifically, as illustrated by the long dashed double-short dashed line in FIG. 16, a hand on/off determination unit 114 configured to determine whether the driver is grasping or has released the steering wheel 2 is provided. The hand on/off determination unit 114 may determine whether the driver is grasping or has released the steering wheel 2 on the basis of an output signal from a touch sensor (not illustrated) provided to the steering wheel 2, determine whether the driver is grasping or has released the steering wheel 2 on the basis of an image captured by a camera (not illustrated) provided in the vehicle, etc. The hand on/off determination unit 114 may be configured otherwise than discussed earlier as long as the hand on/off determination unit 114 can determine whether the driver is grasping or has released the steering wheel 2.

The hand on/off determination unit 114 outputs the manual steering mode setting signal S3 when a change is made from a state (release state) in which the driver is not grasping the steering wheel 2 to a state (grasping state) in which the driver is grasping the steering wheel 2. When a change is made from the grasping state to the release state, on the other hand, the hand on/off determination unit 114 outputs the automatic steering mode setting signal S2. In the case where such a hand on/off determination unit 114 is provided, the driver can preferably switch between an operation mode in which switching between the automatic steering mode and the manual steering mode is made on the basis of the hand on/off determination unit 114 and an operation mode in which such switching is made on the basis of the second and third mode switches 112 and 113.

Figure 19:
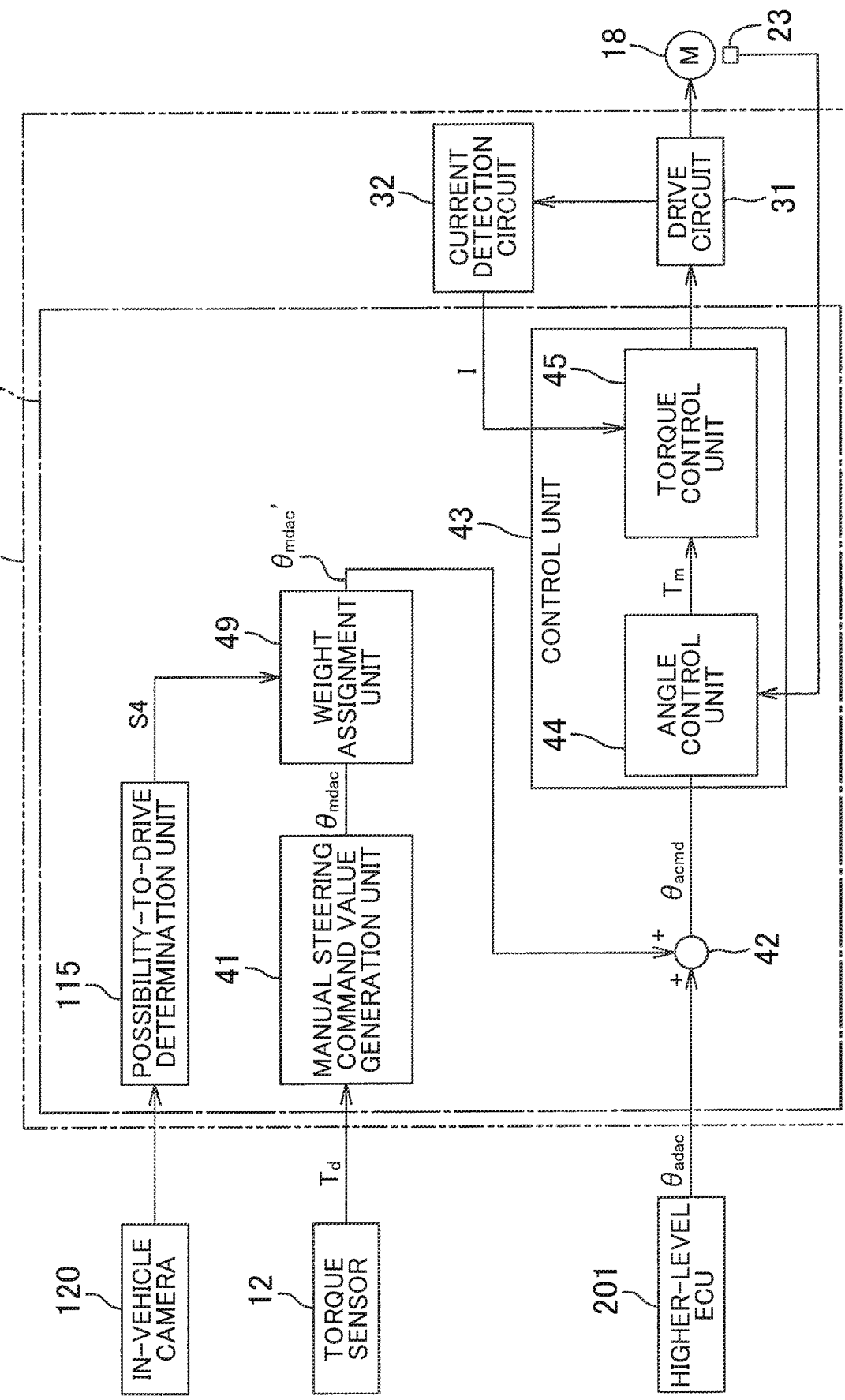
FIG. 19 is a block diagram illustrating a third modification of the motor control ECU.

FIG. 19 is a block diagram illustrating a third modification of the motor control ECU. In FIG. 19, sections corresponding to the units in FIG. 2 discussed earlier are given the same reference numerals as in FIG. 2. A motor control ECU 202C in FIG. 19 differs from the motor control ECU 202 in FIG. 2 in being provided with a possibility-to-drive determination unit 115 and a weight assignment unit 49. The weight assignment unit 49 is an example of a "second weight assignment unit according to the present invention".

The possibility-to-drive determination unit 115 determines, on the basis of a video of the driver captured by an in-vehicle camera 120 provided in the vehicle, for example, whether or not the driver is prohibited to drive. For example, the possibility-to-drive determination unit 115 determines that the driver is prohibited to drive when it is determined that the driver is highly likely to be dozing. When it is determined that the driver is prohibited to drive, the possibility-to-drive determination unit 115 outputs a drive prohibition signal S4. The drive prohibition signal S4 is provided to the weight assignment unit 49.

The weight assignment unit 49 is provided between the manual steering command value generation unit 41 and the integrated angle command value computation unit 42. The weight assignment unit 49 performs a weight assignment process on the manual steering command value $\theta_{mdac}$ in accordance with the drive prohibition signal S4 which is provided from the possibility-to-drive determination unit 115. Specifically, the weight assignment unit 49 first sets a weight $W_{md}$ when the drive prohibition signal S4 is input. Next, the weight assignment unit 49 multiplies the manual steering command value $\theta_{mdac}$ that is generated by the manual steering command value generation unit 41, by the weight $W_{md}$. Then, the weight assignment unit 49 provides the product $W_{md} \cdot \theta_{mdac}$ to the integrated angle command value computation unit 42 as a manual steering command value $\theta_{mdac}$ after the weight assignment process.

The weight $W_{md}$ is set in accordance with the characteristics that are indicated by the polygonal line L4 in FIG. 18 discussed earlier, for example. That is, the weight $W_{md}$ is gradually decreased from 1.0 to zero since time t1 when the drive prohibition signal S4 is input until the predetermined time T elapses at time t2. Then, the weight $W_{md}$ is maintained at zero after time t2. Thus, when the drive prohibition signal S4 from the possibility-to-drive determination unit 115 is input to the weight assignment unit 49, the absolute value of the manual steering command value $\theta_{mdac}'$ after the weight assignment process is gradually decreased to become zero after the predetermined time T elapses. Then, the manual steering command value $\theta_{mdac}'$ after the weight assignment process is maintained at zero thereafter. Consequently, the steering mode is switched to the automatic steering mode. Thus, even if the driver performs a steering operation thereafter, the steering operation is not reflected in the motor control. Consequently, the electric motor 18 can be prevented from being controlled on the basis of a steering operation by the driver when the driver is prohibited to drive.

In the third modification, a mode switch configured to return the steering mode from the automatic steering mode to the normal steering mode is preferably provided. While an embodiment of the present invention has been described above, the present invention may be implemented in other embodiments. For example, while the command value setting unit 52 (see FIGS. 3, 12, and 13) sets the manual steering command value $\theta_{mdac}$ on the basis of a reference EPS model in the embodiments discussed earlier, the command value setting unit 52 may set the manual steering command value $\theta_{mdac}$ by a different method.

For example, the command value setting unit 52 may set the manual steering command value $\theta_{mdac}$ using a map that stores the relationship between the steering torque $T_d$ and the manual steering command value $\theta_{mdac}$. More specifically, the command value setting unit 52 may include the map for each combination of the spring constant k and the viscous damping coefficient c, and acquire from the map the manual steering command value $\theta_{mdac}$ corresponding to the spring constant k and the viscous damping coefficient c that are set in advance or computed and the steering torque $T_d$ that is detected by the torque sensor 12. The command value setting unit 52 may be configured to include the map for each vehicle speed or each estimated disturbance torque value $T_{lc}$ that is computed by the disturbance torque estimation unit 64.

In the embodiment discussed earlier, the angle control unit 44 (see FIG. 6) includes the feedforward control unit 63. However, the feedforward control unit 63 may be omitted. In this case, the feedback control torque $T_{fb}$ that is computed by the feedback control unit 62 is used as basic target torque. In the embodiment discussed earlier, the disturbance torque estimation unit 64 estimates the disturbance torque $\hat{T}_{lc}$ on the basis of the motor torque command value $T_m$ and the rotational angle $\theta$ of the plant. However, a motor torque acquisition unit that acquires motor torque generated by the electric motor 18 may be provided, and the motor torque that is acquired by the motor torque acquisition unit may be used in place of the motor torque command value $T_m$.

In the embodiment discussed earlier, the present invention is applied to motor control for an EPS of a column assist type. However, the present invention is also applicable to motor control for EPSs other than the column assist type. The present invention is also applicable to control for electric motors for steered angle control for a steer-by-wire system. Besides, a variety of design changes may be made to the present invention without departing from the scope described in the claims.

What is claimed is:

1. A power steering system comprising:
an electric motor;
an output shaft driven by the electric motor;
a rack and pinion steering operation mechanism that controls steering of vehicle wheels, the output shaft being mechanically coupled to the rack and pinion steering operation mechanism;
a motor control device that performs drive control on the electric motor for steering angle control, the motor control device comprising:
a manual steering command value generation unit that generates a manual steering command value using steering torque;
an integrated angle command value computation unit that computes an integrated angle command value by adding the manual steering command value to an automatic steering command value; and
a control unit that performs the steering angle control on the electric motor on the basis of the integrated angle command value, wherein
the control unit includes
a basic torque command value computation unit that computes a basic torque command value on the basis of the integrated angle command value,
a disturbance torque estimation unit that estimates disturbance torque other than motor torque that is generated by the electric motor and acts on the output shaft, the disturbance torque including at least the steering torque, road surface load torque, and friction torque, and
a disturbance torque compensation unit that corrects the basic torque command value in accordance with the disturbance torque.

2. The power steering system according to claim 1, wherein
the manual steering command value generation unit is configured to generate the manual steering command value using the steering torque and a spring constant and a viscous damping coefficient for generating the road surface load torque.

3. The power steering system according to claim 2, wherein
the spring constant is set in accordance with the disturbance torque that is estimated by the disturbance torque estimation unit, and the viscous damping coefficient is set in advance to a predetermined value.

4. The power steering system according to claim 2, wherein
the spring constant and the viscous damping coefficient are set in accordance with the disturbance torque that is estimated by the disturbance torque estimation unit.

5. The power steering system according to claim 1, wherein:
the disturbance torque estimation unit is configured to re-estimate the disturbance torque and estimate a rotational angle of the output shaft on the basis of the basic torque command value after being corrected by the disturbance torque compensation unit or the motor torque that is generated by the electric motor and a rotational angle of the electric motor; and
the basic torque command value computation unit includes
an angle deviation computation unit that computes an angle deviation that is a difference between the integrated angle command value and the rotational angle of the output shaft, and
a feedback computation unit that computes the basic torque command value by performing predetermined feedback computation on the angle deviation.

6. The power steering system according to claim 1, wherein:
the disturbance torque estimation unit is configured to re-estimate the disturbance torque and estimate a rotational angle of the output shaft on the basis of the basic torque command value after being corrected by the disturbance torque compensation unit or the motor torque that is generated by the electric motor and a rotational angle of the electric motor; and
the basic torque command value computation unit includes
an angle deviation computation unit that computes an angle deviation that is a difference between the integrated angle command value and the rotational angle of the output shaft, and
a feedback computation unit that computes feedback control torque by performing predetermined feedback computation on the angle deviation,
a feedforward computation unit that computes feedforward control torque by multiplying a second-order differential value of the integrated angle command value by a predetermined value, and
an addition unit that computes the basic torque command value by adding the feedforward control torque to the feedback control torque.

7. The power steering system according to claim 1, further comprising
a first weight assignment unit that performs a weight assignment process on the automatic steering command value in accordance with predetermined first information, wherein
the integrated angle command value computation unit is configured to compute the integrated angle command value by adding the manual steering command value to the automatic steering command value after the weight assignment process by the first weight assignment unit.

8. The power steering system according to claim 1, further comprising
a weight assignment unit that performs a weight assignment process on the manual steering command value in accordance with predetermined information, wherein
the integrated angle command value computation unit is configured to compute the integrated angle command value by adding the manual steering command value after the weight assignment process by the weight assignment unit to the automatic steering command value.

9. The power steering system according to claim 1, further comprising:
a first weight assignment unit that performs a weight assignment process on the automatic steering command value in accordance with predetermined first information; and
a second weight assignment unit that performs a weight assignment process on the manual steering command value in accordance with predetermined second information, wherein
the integrated angle command value computation unit is configured to compute the integrated angle command value by adding the manual steering command value after the weight assignment process by the second weight assignment unit to the automatic steering command value after the weight assignment process by the first weight assignment unit.

10. The power steering system according to claim 1, wherein
the disturbance torque compensation unit corrects the basic torque command value in accordance with the disturbance torque by subtracting the disturbance torque from the basic torque command value.

11. A power steering system comprising:
an electric motor;
an output shaft driven by the electric motor;
a rack and pinion steering operation mechanism that controls steering of vehicle wheels, the output shaft being mechanically coupled to the rack and pinion steering operation mechanism;
a motor control device that performs drive control on the electric motor for steering angle control, the motor control device comprising a processor programmed to:
generate a manual steering command value using steering torque;
compute an integrated angle command value by adding the manual steering command value to an automatic steering command value;
perform the steering angle control on the electric motor on the basis of the integrated angle command value;
compute a basic torque command value on the basis of the integrated angle command value;
estimate a disturbance torque other than motor torque that is generated by the electric motor and acts on the output shaft, the disturbance torque including at least the steering torque, road surface load torque, and friction torque; and
correct the basic torque command value in accordance with the disturbance torque.

* * * * *